United States Patent [19]
Koizumi et al.

[11] Patent Number: 5,892,974
[45] Date of Patent: Apr. 6, 1999

[54] SYSTEM FOR SUB-DATA PROCESSOR IDENTIFIES THE PERIPHERAL FROM SUPPLIED IDENTIFICATION DATA AND SUPPLIES DATA INDICATIVE OF THE KIND OF PERIPHERAL TO MAIN DATA PROCESSOR

[75] Inventors: Masahiro Koizumi; Naoki Niizuma; Yasuhisa Kawase; Hamjime Ikebe; Masaki Kawabori, all of Tokyo, Japan

[73] Assignee: Sega Enterprises Ltd., Tokyo, Japan

[21] Appl. No.: 656,226

[22] PCT Filed: Oct. 11, 1995

[86] PCT No.: PCT/JP95/02072

§ 371 Date: Sep. 24, 1996

§ 102(e) Date: Sep. 24, 1996

[87] PCT Pub. No.: WO96/12249

PCT Pub. Date: Apr. 25, 1996

[30] Foreign Application Priority Data

Oct. 12, 1994 [JP] Japan .................................. 6-246579
Oct. 12, 1994 [JP] Japan .................................. 6-246580

[51] Int. Cl.[6] ...................................................... G06F 9/445
[52] U.S. Cl. ................................................................ 395/836
[58] Field of Search ................................ 364/238.4, 857, 364/834

[56] References Cited

U.S. PATENT DOCUMENTS

| 4,534,011 | 8/1985 | Andrews et al. | 395/878 |
| 4,862,156 | 8/1989 | Westberg et al. | 345/133 |
| 4,912,672 | 3/1990 | Giorgio | 395/893 |
| 5,157,519 | 10/1992 | Jacobs | 358/470 |
| 5,473,595 | 12/1995 | Hayashi et al. | 369/124 |
| 5,670,992 | 9/1997 | Yasuhara et al. | 345/173 |

FOREIGN PATENT DOCUMENTS

WO 94/16774  8/1994  WIPO.

Primary Examiner—Thomas C. Lee
Assistant Examiner—Anderson I. Chen
Attorney, Agent, or Firm—Finnegan, Henderson, Farabow, Garrett & Dunner, L.L.P.

[57] ABSTRACT

A data processing apparatus achieves high-speed image control, image control responding rapidly to the content of the operation of a peripheral, avoidance of possible wrong recognition of the peripheral. A subCPU is connected through a CPU bus to a main CPU which provides image control, etc. When the main CPU delivers command data to the subCPU through a register table, the subCPU determines peripheral data collection timing and collects peripheral data from the peripheral at that timing. The main CPU receives through the register table the peripheral data collected by the subCPU. The subCPU receives the peripheral data ID-1 (identification data) twice. If both the values of those peripheral data are different, the main CPU determines that the peripheral has not been connected to the peripheral port.

38 Claims, 27 Drawing Sheets

| SIGNAL NAME | PIN NO. | REMARKS |
|---|---|---|
| TH | 4 | CONTROL SIGNAL FROM GAME APPARATUS |
| TR | 5 | CONTROL SIGNAL FROM GAME APPARATUS |
| TL | 6 | CONTROL SIGNAL TO GAME APPARATUS (ack) |
| R | 7 | DATA SIGNAL (THIRD BIT) |
| L | 8 | DATA SIGNAL (SECOND BIT) |
| D | 2 | DATA SIGNAL (FIRST BIT) |
| U | 3 | DATA SIGNAL (0-th BIT) |
| Vcc | 1 | POWER SOURCE (+5V) |
| GND | 9 | GND |

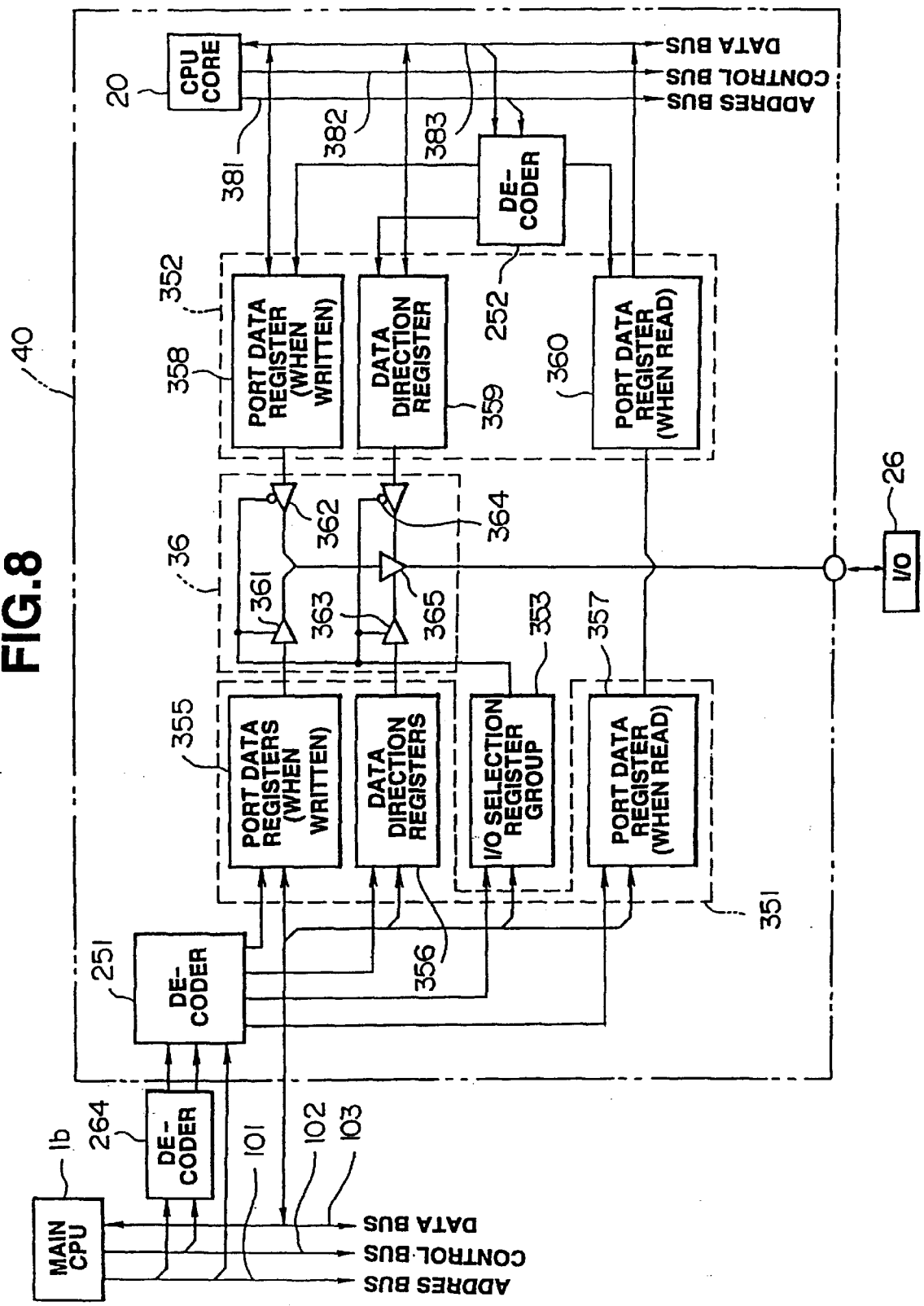

FIG.9

| I/O SELECTION REGISTER | I/O RIGHT OF ACCESS | DATA DIRECTION REGISTER | I/O DIRECTION | PORT DATA REGISTER SET VALUE | CMOS STATE | I/O TERMINAL STATE IS INPUT STATE | PORT DATA REGISTER READ VALUE |
|---|---|---|---|---|---|---|---|
| 0 | SUB CPU | 0 | INPUT | 0 | DETERMINED BY SUB CPU | 0 | 0 |
| 0 | SUB CPU | 0 | INPUT | 0 | DETERMINED BY SUB CPU | 1 | 1 |
| 0 | SUB CPU | 0 | INPUT | 1 | DETERMINED BY SUB CPU | 0 | 0 |
| 0 | SUB CPU | 0 | INPUT | 1 | DETERMINED BY SUB CPU | 1 | 1 |
| 0 | SUB CPU | 1 | INPUT | 0 | DETERMINED BY SUB CPU | 0 | 0 |
| 0 | SUB CPU | 1 | INPUT | 0 | DETERMINED BY SUB CPU | 1 | 1 |
| 0 | SUB CPU | 1 | INPUT | 1 | DETERMINED BY SUB CPU | 0 | 0 |
| 0 | SUB CPU | 1 | INPUT | 1 | DETERMINED BY SUB CPU | 1 | 1 |
| 1 | MAIN CPU | 0 | INPUT | 0 | HIGH INPEDANCE | 0 | 0 |
| 1 | MAIN CPU | 0 | INPUT | 0 | HIGH INPEDANCE | 1 | 1 |
| 1 | MAIN CPU | 0 | INPUT | 1 | PULL-UP MOS ON | 0 | 0 |
| 1 | MAIN CPU | 0 | INPUT | 1 | PULL-UP MOS ON | 1 | 1 |
| 1 | MAIN CPU | 1 | OUTPUT | 0 | NMOS ON | — | 0 |
| 1 | MAIN CPU | 1 | OUTPUT | 0 | NMOS ON | — | 0 |
| 1 | MAIN CPU | 1 | OUTPUT | 1 | PULL-UP MOS&PMOS ON | — | 1 |
| 1 | MAIN CPU | 1 | OUTPUT | 1 | PULL-UP MOS&PMOS ON | — | 1 |

FIG.10

| PERIPHERAL | ID-1 | PERIPHERAL | ID-1 |
|---|---|---|---|
|  | F | 4P ADAPTOR | 7 |
|  | E |  | 6 |
| (3TRG/6TGR/PAD) | D | CONTROLLER (PERIPHERAL ID-2) | 5 |
|  | C |  | 4 |
| CONTROL PAD | B | MOUSE | 3 |
|  | A |  | 2 |
|  | 9 |  | 1 |
|  | 8 |  | 0 |

FIG.11

| PERIPHERAL | ID-2 | PERIPHERAL | ID-2 |
|---|---|---|---|
| NON-CONNECTION | F |  | 7 |
|  | E |  | 6 |
|  | D |  | 5 |
|  | C |  | 4 |
|  | B | KEYBOARD | 3 |
|  | A | POINTING DEVICE | 2 |
|  | 9 | ANALOG DEVICE | 1 |
|  | 8 | DIGITAL DEVICE | 0 |

FIG.12

| COMMUNICATION MODE | TH=1, TR=1 | | | | TH=0, TR=1 | | | |
|---|---|---|---|---|---|---|---|---|
| | R | L | D | U | R | L | D | U |
| TH/TR-SELECTION | TRG-L | 1 | 0 | 0 | RIGHT | LEFT | DOWN | UP |
| THREE-WIRE HANDSHAKE | 0 | 0 | 0 | 1 | 0 | 0 | 0 | 1 |
| CLOCKED SERIAL | 0 | 0 | 1 | 0 | 0 | 0 | 1 | 0 |
| CLOCKED PARALLEL | 0 | 0 | 1 | 1 | 0 | 0 | 1 | 1 |

FIG.13A

TERMINAL PINS OF PLUG CONNECTOR
FOR TH/TR-SELECTION AND THREE-WIRE
HANDSHAKE COMMUNICATION MODES

1 — Vcc
2 — D
3 — U
4 — TH
5 — TR
6 — TL
7 — R
8 — L
9 — GND

FIG.13B

TERMINAL PINS OF PLUG CONNECTOR
FOR CLOCKED PARALLEL COMMUNICATION MODES

1 — Vcc
2 — D
3 — U
4 — TH
5 — TR
6 — TL
7 — R
8 — L
9 — GND

FIG.13C

TERMINAL PINS OF PLUG CONNECTOR
FOR CLOCKED SERIAL COMMUNICATION MODES

1 — Vcc
2 — D
3 — U
4 — TH
5 — TR
6 — TL
7 — R
8 — L
9 — GND

FIG.14

| DATA | TH | TR | TL | R | L | D | U |
|---|---|---|---|---|---|---|---|
| | Bbit6 | bit5 | bit4 | bit3 | bit2 | bit1 | bit0 |
| | OUTPUT | OUTPUT | INPUT | INPUT | INPUT | INPUT | INPUT |
| 1st | 1 | 1 | 1 | TRG-L | 1 | 0 | 0 |
| 2nd | 0 | 1 | 1 | RIGHT | LEFT | DOWN | UP |
| 3rd | 1 | 0 | 1 | START | TRG-A | TRG-C | TRG-B |
| 4th | 0 | 0 | 1 | TRG-R | TRG-X | TRG-Y | TRG-Z |

FIG.17A

| TH (INPUT) | TR (INPUT) | TL (GND) | R (GND) | L (GND) | D (Vcc) | U (DATA) | REMARKS |
|---|---|---|---|---|---|---|---|
| 1 | 1 | 0 | 0 | 0 | 1 | 0 | ID-1(1st) |
| 0 | 1 | 0 | 0 | 0 | 1 | 0 | ID-1(2nd) |
| 0 | ↑ | 0 | 0 | 0 | 1 | SMD3 | |
| 0 | ↓ | 0 | 0 | 0 | 1 | SMD2 | |
| 0 | ↑ | 0 | 0 | 0 | 1 | SMD1 | |
| 0 | ↓ | 0 | 0 | 0 | 1 | SMD0 | |
| 0 | ↑ | 0 | 0 | 0 | 1 | ID-23 | |
| 0 | ↓ | 0 | 0 | 0 | 1 | ID-22 | |
| 0 | ↑ | 0 | 0 | 0 | 1 | ID-21 | |
| 0 | ↓ | 0 | 0 | 0 | 1 | ID-20 | |
| 0 | ↑ | 0 | 0 | 0 | 1 | DSIZE3 | |
| 0 | ↓ | 0 | 0 | 0 | 1 | DSIZE2 | |
| 0 | ↑ | 0 | 0 | 0 | 1 | DSIZE1 | |
| 0 | ↓ | 0 | 0 | 0 | 1 | DSIZE0 | |
| 0 | ↑ | 0 | 0 | 0 | 1 | DATA7 | |
| ... | ... | ... | ... | ... | ... | ... | |
| 0 | ↑ | 0 | 0 | 0 | 1 | DATA0 | |
| 0 | ↓ | 0 | 0 | 0 | 1 | CCB | |
| 0 | ↑ | 0 | 0 | 0 | 1 | 1 | |
| 0 | ↓ | 0 | 0 | 0 | 1 | 0 | |
| 1 | 1 | 0 | 0 | 0 | 1 | 0 | END |

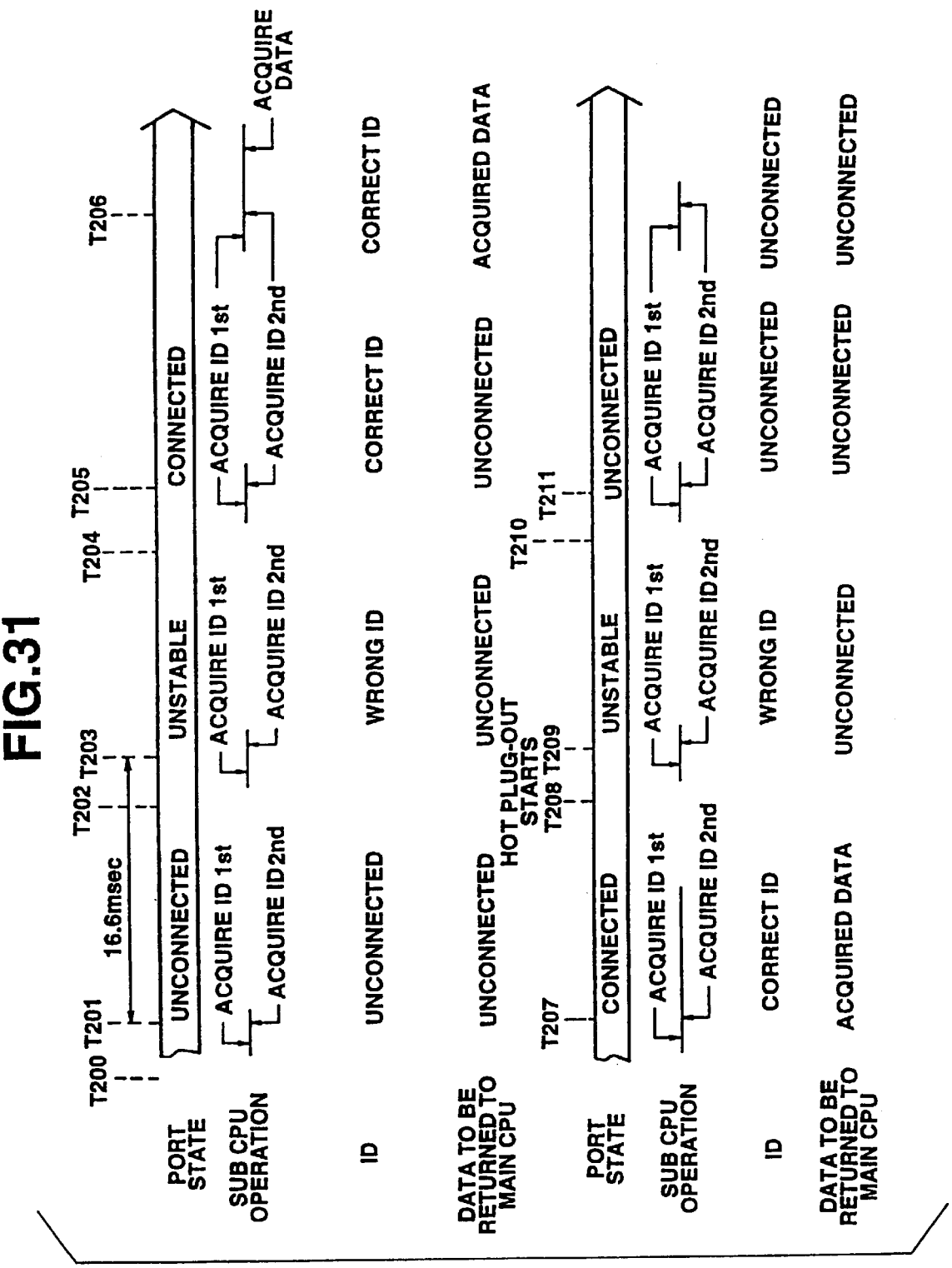

5,892,974

SYSTEM FOR SUB-DATA PROCESSOR IDENTIFIES THE PERIPHERAL FROM SUPPLIED IDENTIFICATION DATA AND SUPPLIES DATA INDICATIVE OF THE KIND OF PERIPHERAL TO MAIN DATA PROCESSOR

TECHNICAL BACKGROUND OF THE INVENTION

The present invention relates to improvements in data collection of a data processing apparatus from peripherals connected to the data processing apparatus, and more specifically, to improvements in CPU control for collecting peripheral data from peripherals thereof, in timing optimization of peripheral data collection, and in connection confirmation of peripherals to the data processing apparatus.

BACKGROUND ART OF THE INVENTION

Data processing systems such as video game systems have widely spread to homes as recent computer techniques have developed.

Generally, such game system includes a processing apparatus which executes various data processing such as image processing, and sound processing and control of the peripherals, and peripherals such as switch controller (joypads and joysticks) connected electrically to the processing apparatus. A television receiver (hereinafter referred to as a monitor) is connected to the processing apparatus. The processing apparatus is operated to display video images for a game on the monitor screen. A sound suitable for the development of a game is produced from a sound reproducing unit of the monitor to thereby play a desired game.

The processing apparatus of the game system basically includes an operation circuit (CPU) which performs various processing such as image processing, and audio processing, and control of peripherals, a memory or storage which stores various game programs and other required data, an input/output unit to which a peripheral, for example, a switch controller is connected, a video processor which provides a video signal to the monitor, and other circuits.

When in such game system a power supply of the game system is turned on and a required operation signal is input to the processing apparatus from a peripheral, the processing apparatus operates in accordance with a program in the storage to perform the following processing.

When the operation signal from the switch controller is received by the processor apparatus, the CPU fetches required items of data on various movement states of characters in the storage on the basis of the operation signal and performs a process for moving the character on the monitor display. The CPU gives a video control signal to the video processor, which generates a video signal on the basis of the video control signal and delivers it to the monitor. Thus, the character moves a distance designated by the switch controller in a predetermined background picture on the display of the monitor. For example, in a video game system, the CPU monitors the operational state of a joystick. When the joystick is operated by the user, the CPU reads a change in the joystick state to revolve an airplane on the monitor screen.

The processing apparatus of the game system has a peripheral port with a socket connector through which various peripherals are connected to the processing apparatus in accordance with application software for games. For example, when game software for a flight simulation is performed, a connector on the joystick side is plugged into the socket connector on the game device side. The processing apparatus reads identification data from a connected peripheral to automatically recognize the kind of that peripheral and accesses the peripheral in dependence on the kind of that peripheral.

However, data processing apparatus such as that in the conventional video game systems have the following problems and hence smooth use of the video game systems at high speed is difficult.

First, it is difficult to perform data processing such as image control at high speed. Conventionally, since a CPU for the image processing directly accesses and controls peripherals. Thus, the CPU requires a time for the control of peripherals and the time required for the image processing is forced to decrease. For example, several $\mu$sec is required to read data from a standard joypad and hundreds of $\mu$sec is required for reading data from a mouse. There are many kinds of peripherals to be connected to the video game system and the video game system is required to adapt to all the peripherals. Thus, the CPU is required to automatically recognize peripherals connected to the video game system. As just described above, as long as the CPU accesses a peripheral, the CPU is required to temporality stop data processing for the image control until the access to the peripheral ends. As a result, there occurs a serious problem that high speed image control (data processing) would be difficult.

Second, it is difficult to rapidly reflect in the content of the operation on the peripheral side to data processing such as the image control. Generally, data processing apparatus such as video game systems have two frame buffers to store image data for two pictures. When an image stored in a one of the frame buffers has been displayed, the CPU provides control over the image stored in the other frame buffer (three-dimensional operation, delineation, etc.). Such operation is shown in a timing chart of FIG. 23 described later, in which the two frame buffers include, as memory areas, corresponding frames or pictures A and B. For example, a three-dimensional operation is being performed for an image on the frame A, the image on the frame B is displayed. While a three-dimensional operation for an image on the frame B is being performed in the next field, the image on the frame A is displayed. While the operation of the image is performed for a period of one field (from a fall of a vertical blanking signal VINT signal to the next rise in the VINT signal). In this case, display of the image is performed for a period of vertical operation of one field. As shown in FIG. 24 described later, operation and display can be performed in units of fields (usually, even-numbered fields) depending on application software used.

As will be confirmed in FIG. 24, image control (data processing) such as the three-dimensional operation must be performed at a predetermined time. The timing of collecting peripheral data has not been controlled. Thus, when the timing of collecting peripheral data is not coincident with the timing of starting the operation for image control (data processing) by the CPU, the peripheral data can change after it has been collected. For example, as shown in FIG. 20 described later, assume that the CPU has collected peripheral data in an interval of "(1)", as shown. Thereafter, even when the peripheral data changes due to the user's operation of the peripheral, the CPU performs image control on the basis of the peripheral data before it changes. Thus, the new changed peripheral data is not used in the image control. When the peripheral data collection timing is not coincident with the timing of starting the operation for the image control, the reaction of the game in response to the operation of the peripheral would be delayed. For example, the time of from the user's operation of the peripheral to launching a missile increases to thereby hinder the execution of the game.

Third, since it cannot be determined correctly whether the peripheral has been connected to the processing apparatus, there occurs a serious problem that the peripheral will be wrongly recognized on the basis of wrong identification data.

For example, in a data processing apparatus such as that in a video game system, where a power supply has been turned on, the user can plug a peripheral side connector into the processing apparatus connector (hot plug-in) or pull the peripheral away from the processing apparatus connector (hot plug-out). When the hot plug-in or -out is occurred while the processing apparatus is reading identification data from the peripheral, the processing apparatus can read wrong identification data. In this case, since the processing apparatus can not correctly determine whether the peripheral has been connected to the processing apparatus, there occurs a serious problem that the processing apparatus would wrongly recognize the peripheral on the basis of wrong identification data.

When the user plugs the peripheral side connector obliquely into the processing apparatus side connector, some of the terminal pins in the connector would be unconnected to the terminal pins of the processing apparatus side connector. Even in this case, the processing apparatus can not determine whether the peripheral has been connected to the processing apparatus in a stabilized state and hence would wrongly recognize the peripheral on the basis of the wrong identification data.

Even when, for example, the hot plug-out occurs after the processing apparatus has correctly recognized the peripheral, the processing apparatus cannot determine whether the peripheral has been connected. Thus, the following problems would occur. When hot plug-out occurs while the peripheral is transmitting peripheral data (representing the operated state of the peripheral) to the processing apparatus, part of the peripheral data would change, so that processing apparatus would receive wrong peripheral data. As a result, there would write a problem of malfunction. In home video game systems in which hot plug-in is likely to occur, these problems are especially serious.

SUMMARY OF THE INVENTION

It is therefore an object of an present invention to provide an optimal game environment, for example, in a video game system by solving the above problems. More specifically, a first object of the present invention is to provide a data processing apparatus which is capable of providing data processing such as image control at high speed. A second object of the present invention is to provide a data processing apparatus and a data processing method in which the content of operation of a peripheral is reflected directly in data processing such as image control. A third object of the present invention is to provide a game processing apparatus and data processing method which is capable of solving problems such as. wrong recognition of a peripheral and problems such as wrong operation of the game processing apparatus and peripherals and data processing methods, by determining whether the peripheral has been connected to the game device body in a stabilized manner.

As for one aspect of the invention, the suboperation means is provides to control and process input/output data to/from the peripheral in accordance with a command from the main operation means. Thus, the main operation means is not required to directly control and process input/output data to/from the peripheral, so that the main operation means can be assigned to other jobs thereby to perform a larger amount of data processing (video processing, audio processing). Thus, for example, in a data processing apparatus such as a video game system, video image control is provided at higher speed to thereby provide a game overflowing with realism.

The suboperation means identifies the kind of the peripheral by reading identification data from the peripheral. The output means supplies data on the kind of the peripheral to the main operation means. The suboperation means performs not only the input/output operation of the peripheral data but also identifies the peripheral. Thus, the main operation means can be assigned to process other data than peripheral so that the system is capable of processing a larger amount of data.

The connection switching means is capable of selectively connecting the peripheral to any one of the main operation means and the suboperation means. Thus, the main operation means having a higher processing speed is able to access a peripheral which requires high speed access.

The connection switching means selectively connects the peripheral to the main operation means or the suboperation means. When the suboperation means is connected to the peripheral, data input/output to/from the peripheral is performed by the suboperation means. In this case, the main operation means performs data processing such as image processing convergently. Thus, the inventive data processing apparatus reduces the load on the main operation means to achieve rapid data processing.

The connection switching means connects the peripheral to the main operation means or the suboperation means in response to a switching signal from the main operation means. Thus, both of the image processing characteristic and the data input/output characteristic for the peripheral are maintained optimal in dependence on the characteristics, content, etc., of an image processing environment which include the kind of the peripheral, the content of the program of the main operation means, etc.

For example, when the switching means is switched, in accordance with the operational speed characteristic-of the peripheral, the connection switching means connects the peripheral to the suboperation means when the peripheral is of a low speed type to thereby reduce the load on the main operation means. When the peripheral has a high speed operational characteristic, the main operation means which usually has a high processing ability is in charge of inputting/outputting data to/from the peripheral to thereby insure to input/output data to/from the peripheral.

Such connection switching means is preferably realized, for example, by a multiplexer. The inventive data processing apparatus is arranged to control the connection switching means in accordance with the kind, content, etc., of a program executed by the main control means. Thus, if a high-speed peripheral is required, when the main control means performs, for example, an image processing program, the connection switching means is controlled to switch the peripheral to the main control means. If otherwise, the connection switching means connects the peripheral to the suboperation means. Since the connection switching means connects a required peripheral to the main operation means or the suboperation means in accordance with the content and kind of a program executed by the main control means, a peripheral suitable for the kind, content, etc., of the image processing is rapidly selected to thereby prevent, for example, wrong selection of a peripheral.

As for another aspect of the invention, the data collection control means controls the data collection means such that the collection of peripheral data ends directly before the time of starting data processing including as image control, sound processing, etc. Thus, data processing is performed in accordance with peripheral data directly before the time of starting the data processing. For example, in a data processing apparatus including a video game system, the reaction of an image to the user's operation of a switch controller such as a joypad (peripheral) is speeded up.

The data collection control means determines the data collection starting time such that the collection of peripheral data ends directly before the time of starting the data processing. Thus, the data collection means.starts the collection of the peripheral data at the determined time of starting data collection.

Assume that the last collection of peripheral data by the data collection means ends before the time of starting the data processing. In this case, the data collection control means determines the time of starting the collection of the peripheral data on the basis of the peripheral data collected last time such that the collection of the peripheral data by the data collection means ends directly before the time of starting the data processing. When the last collection of the peripheral data does not end before the time of starting the data processing, the data collection starting time determining means advances the time of starting the collection of the peripheral data.

When the collection of the peripheral data does not end before the time of starting the data processing, the peripheral data can not be used at the time of starting the data processing. To avoid this, in the present invention, in such a case, the time of starting the data collection is advanced to thereby prevent the collection of peripheral data from being left interrupted at the time of starting the data processing.

When the data collection control means iterates such processing, peripheral data is collected at an optimal timing at all times.

The data collection control means controls the data collection time in the data collection means such that the collection of peripheral data by the data collection means ends directly before the time of starting the data processing. For example, also, by controlling the transfer speed of the peripheral data, the collection of the peripheral data can be ended directly before the time of starting the data processing.

As for another aspect of the invention, the time of starting the data collection is determined such that the collection of peripheral data ends directly before the time of starting the data processing in order to achieve the first and second objects. Thus, the main operation means is capable of performing data processing on the basis of the collected peripheral data directly before the time of starting the data processing, and the content of the user's operation of the peripheral is immediately reflected in the data processing. Thus, even when the suboperation means for control of the input/output to/from the peripheral is provided in addition to the main operation means for data processing, desirable data processing. is achieved on the basis of the smooth operative cooperation of the main operation and the suboperation.

In the data processing apparatus according to the invention, the determination means determines whether a signal line of the peripheral has been connected to a terminal of the data processing apparatus. That is, by confirming whether the peripheral has been connected to the data processor, the effect of optimization of data processing such as the image processing is produced surely.

As for another aspect of the invention, the time of starting the collection of peripheral data is determined such that the collection of the peripheral data ends directly before the time of starting the data processing. At the determined time of starting the data collection, the collection of the peripheral data starts. Thus, data processing is performed in accordance with peripheral data present directly before the time of starting the data processing to thereby speed up the reaction of the image to the operation of the peripheral.

Assume that the last collection of peripheral data by the data collection means ends before the time of starting the data processing. In this case, the time of starting the collection of the data is determined on the basis of the peripheral data collected last time. If the last collection of peripheral data does not end before the time of starting the data processing, the time of starting the data collection is advanced. Thus, according to the present invention, the reaction of the image to the operation of the peripheral is advanced and collection of the peripheral data is prevented from being left interrupted at the time of starting the data processing.

As for another aspect of the data processing apparatus, the data processing means performs data processing on the basis of data from the peripheral connected to the apparatus side terminal (socket connector pins). The determination means determines whether the signal lines of the peripheral have been connected to the apparatus side terminal. For example, when a signal line or some lines have not been connected in a stabilized manner to the apparatus side terminal, for example, due to hot plug-in, etc., there is a strong probability that data (including identification data indicative of the kind of the peripheral, peripheral data indicative of the state of the peripheral, etc.) received by the data processing means is wrong. Thus, the data processing means recognizes that the received data is wrong. Thus, wrong recognition and wrong operation of the peripheral due to the use of wrong data is avoided beforehand. More specifically, the communication means reads identification data more than once at predetermined intervals of time. The determination means determines that the signal line of the peripheral has been connected to the apparatus side terminal on condition that the identification data has all coincided. For example, when the power supply for the apparatus side is turned on and when the user pulls the signal line of the peripheral away from the apparatus side terminal, the signal level on the apparatus side terminal would change. Thus, identification data read more than once would take various different values. Thus, whether the signal line of the peripheral side has been connected to the apparatus side terminal can be determined in dependence on whether the identification data read more than once coincides with each other. Thus, according to the present invention, by determining the connection state of the signal line, a problem such as wrong recognition of the peripheral is avoided.

The apparatus side terminal (socket connector pins) is pulled up or down beforehand such that predetermined data indicative of the unconnected state of the peripheral or signal line is output when the peripheral or a signal line or some lines are unconnected. Assume that connection confirming data which includes the inverse of the predetermined data has been transmitted from the peripheral at a predetermined time. In this case, the determination means determines whether the connection confirming data received by the communication means is different from the inverse of the predetermined data indicative of the unconnected state of the peripheral or its signal lines. If so, the determination means determines that the peripheral has not been connected to the apparatus side terminal. Thus, a problem such as wrong recognition of a peripheral is avoided beforehand.

The peripheral may be formed so that one or some of its terminals (plug connector pins) are connected with its power source terminal pin and/or ground (GND) terminal pin. When the plug connector is plugged in the peripheral port of the apparatus the determination means checks the signal level or levels on the socket connector terminal pins of the apparatus which correspond to the plug connector terminal pins which are connected with the power source or ground terminal pins of the peripheral. If the signal level or levels are different from the predetermined signal level or levels (power source level or ground level) then the determination means determines that peripheral is not connected or the plug connector pins are not correctly connected to the socket connector pins. Thus, possible wrong recognition of the peripheral is prevented.

In the data processing apparatus according-to the invention, the communication means transmits to the peripheral a signal which requests delivery of data from the peripheral. When the communication means has not received a response signal in a predetermined time after the communication means transmitted the data request signal, the determination means determines that the peripheral has not been connected to the apparatus side terminal. Thus, possible wrong recognition of the peripheral due to hot plug-in, etc., is prevented beforehand.

The data processing method according to the invention, data processing is performed on the basis of data (identification data indicative of the kind of peripheral, peripheral data indicative of the state of the peripheral, etc.) from the peripheral connected to the apparatus side terminal, and it is determined whether the signal line of the peripheral has been connected to the apparatus side terminal. Thus, possible wrong recognition of data is prevented beforehand.

The peripheral involved in the present invention outputs to the data processing apparatus data on the confirmation about whether the peripheral side terminal has been connected to the apparatus. In response, the data processing apparatus determines whether the data on the confirmation received from the peripheral is correct. Thus, data processing apparatus is capable of determining whether the peripheral has been connected to the apparatus in a stabilized manner to thereby avoid a problem such as wrong recognition of the peripheral.

As the data on the confirmation, the peripheral outputs the identification data. That is, the data processing apparatus reads identification data at predetermined intervals of time more than once from the peripheral. The determination means determines whether the peripheral has been connected to the apparatus in a stabilized manner in dependence on whether those identification data coincide.

As the data on the confirmation, the peripheral outputs connection confirming data. That is, the data processing apparatus side terminal is beforehand pulled up or down such that the predetermined data indicating that the peripheral has not been connected to the apparatus side terminal and including an inverse of the connection confirming data is output. Assume that the connection confirming data which includes the inverse of the predetermined data has been transmitted from-the peripheral at a predetermined time. In this case, the determination means determines whether the connection confirming data received by the communication means is different from the inverse of the predetermined data. If so, the determination means determines that the peripheral has not been connected to the apparatus side terminal. Thus, a problem such as possible wrong recognition of the peripheral is avoided beforehand.

The peripheral outputs a signal of as the connection confirming data. That is, some of the terminals of the peripheral have been connected to the power supply or GND. Thus, when the peripheral terminals are connected to the data processing apparatus side terminals, the apparatus side terminals are placed at a predetermined signal level. When the signal level of the apparatus side terminals different from the predetermined signal level, the determination means determines whether the peripheral terminals have not been connected in a stabilized manner to the apparatus side terminals. Thus, a problem such as possible wrong recognition of the peripheral in an unstable connection is avoided.

The peripheral outputs the response signal and peripheral data as the connection confirming data. That is, the peripheral outputs the response signal and peripheral data in accordance with a request signal from the data processing apparatus. Thus, when the data processing apparatus has received no response signal in a predetermined time after the apparatus delivered the request signal to the peripheral, the determination means determines that the peripheral has not been connected in a stabilized manner to the data processing apparatus. Thus, a problem such as possible wrong recognition of the peripheral is avoided.

In order to obtain the above merits, according to another aspect of the invention, there is provided a data processing apparatus to which a peripheral is connected, comprising: a main CPU processing a peripheral data supplied from the peripheral; a first ROM connected to the main CPU; a first RAM serving as a work area for the main CPU; and a sub CPU circuit connected with the main CPU through a bus and detachably connected to the peripheral through a connector, said sub CPU circuit comprising a first interface connected to the bus, a CPU core and a second RAM both connected to the first interface, a second ROM connected to the CPU core, and a second interface connected to both the CPU core and connector, wherein said first ROM stores a first program for sending to the sub CPU circuit an instruction to collect a peripheral data from the peripheral and a second program for fetching the peripheral data collected by the sub CPU circuit: and said second ROM stores a third program for collecting the peripheral data from the peripheral in response to the instruction and providing the main CPU with the collected peripheral data.

According to still another aspect of the invention, there is provided an operating apparatus comprising: a first interface connecting to a peripheral controlling input/output signals to/from the peripheral; a second interface connected to a CPU bus for inputting/outputting signals to/from a main CPU connected to the operating apparatus; a CPU core, connected through an internal bus to the second interface, executing a command provided from the main CPU; a ROM storing a program required for processing of the command; and means for selectively connecting the first interface to either one of the CPU bus and internal bus in compliance with a type of the peripheral.

BRIEF DESCRIPTION OF THE DRAWINGS

In the accompanying drawings:

FIG. 8 is a block diagram indicative of connection switching means of the embodiment;

FIG. 9 shows a truth table for the respective registers of the embodiment;

FIG. 10 shows the relationship in correspondence between peripheral ID-1 and peripheral name of the embodiment;

FIG. 11 shows the relationship in correspondence between peripheral ID-2 and peripheral name of the embodiment;

FIG. 12 illustrates a method of determining a communication system used in the embodiment;

Figure 15:
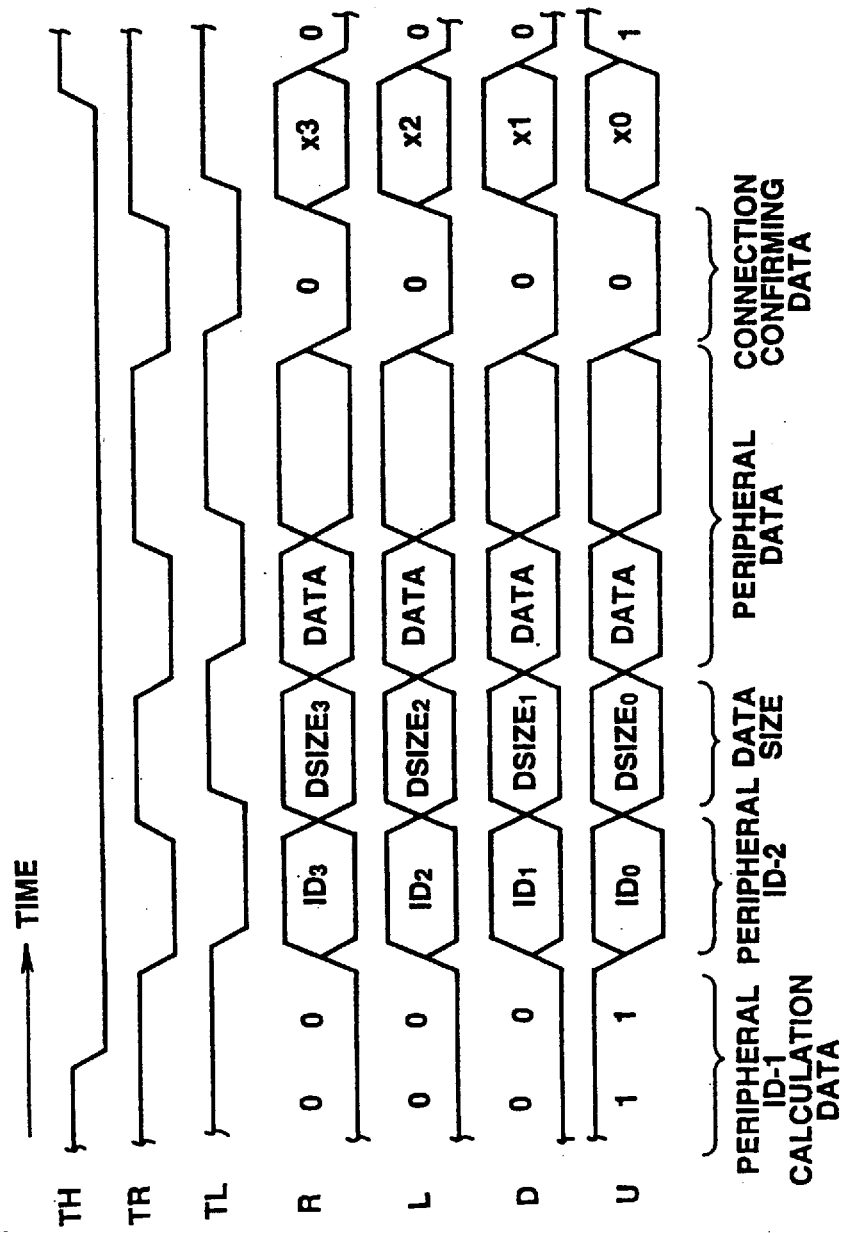
Figure 16:
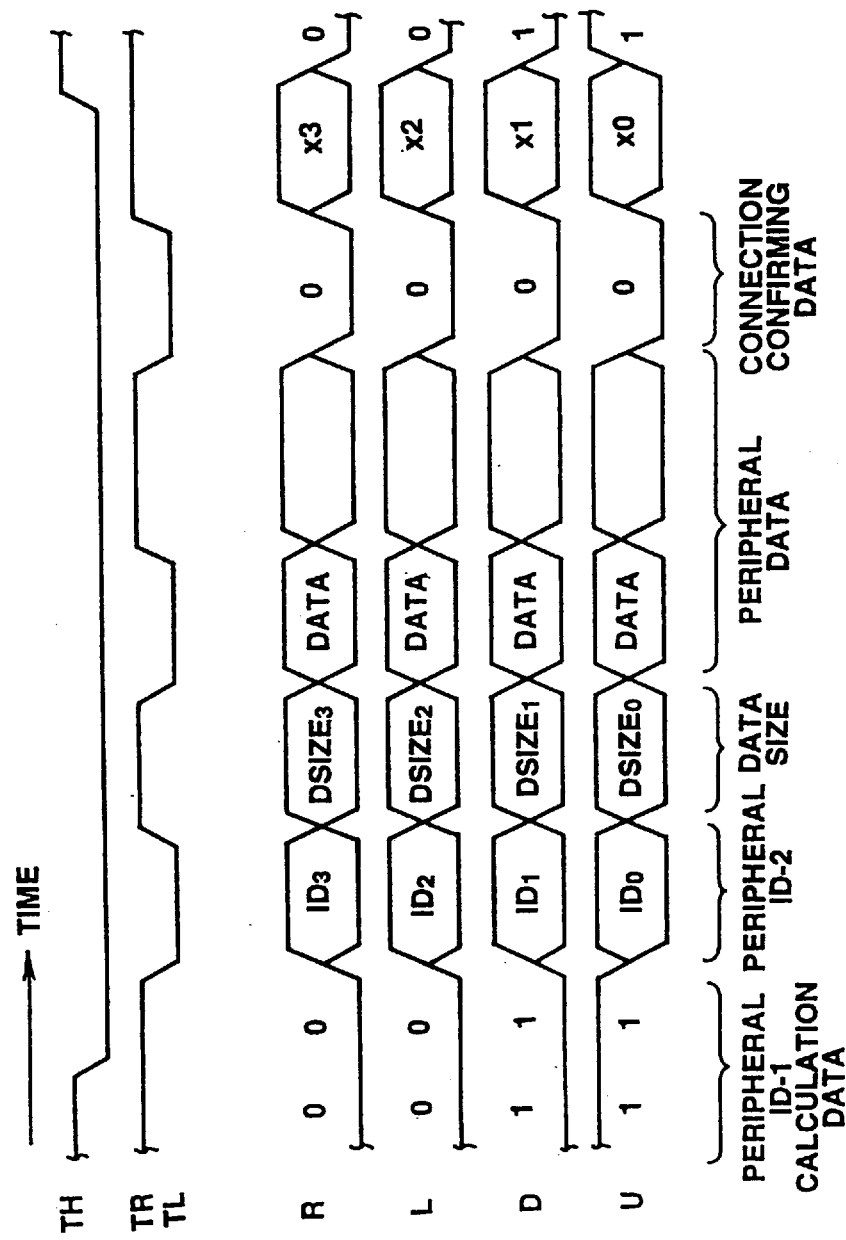
Figure 17B:
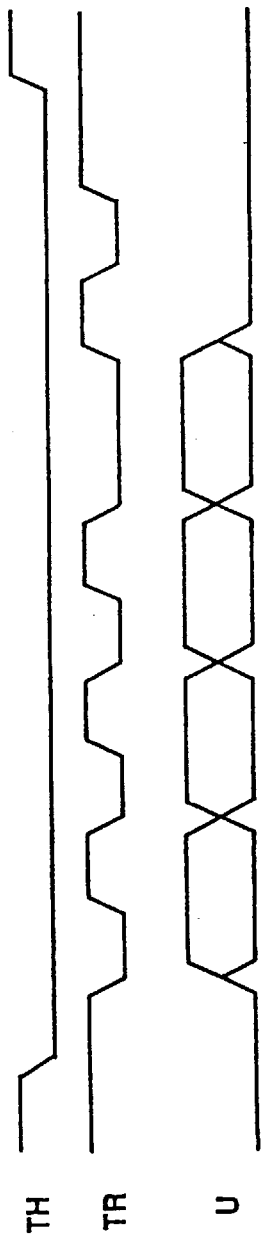
Figure 18:
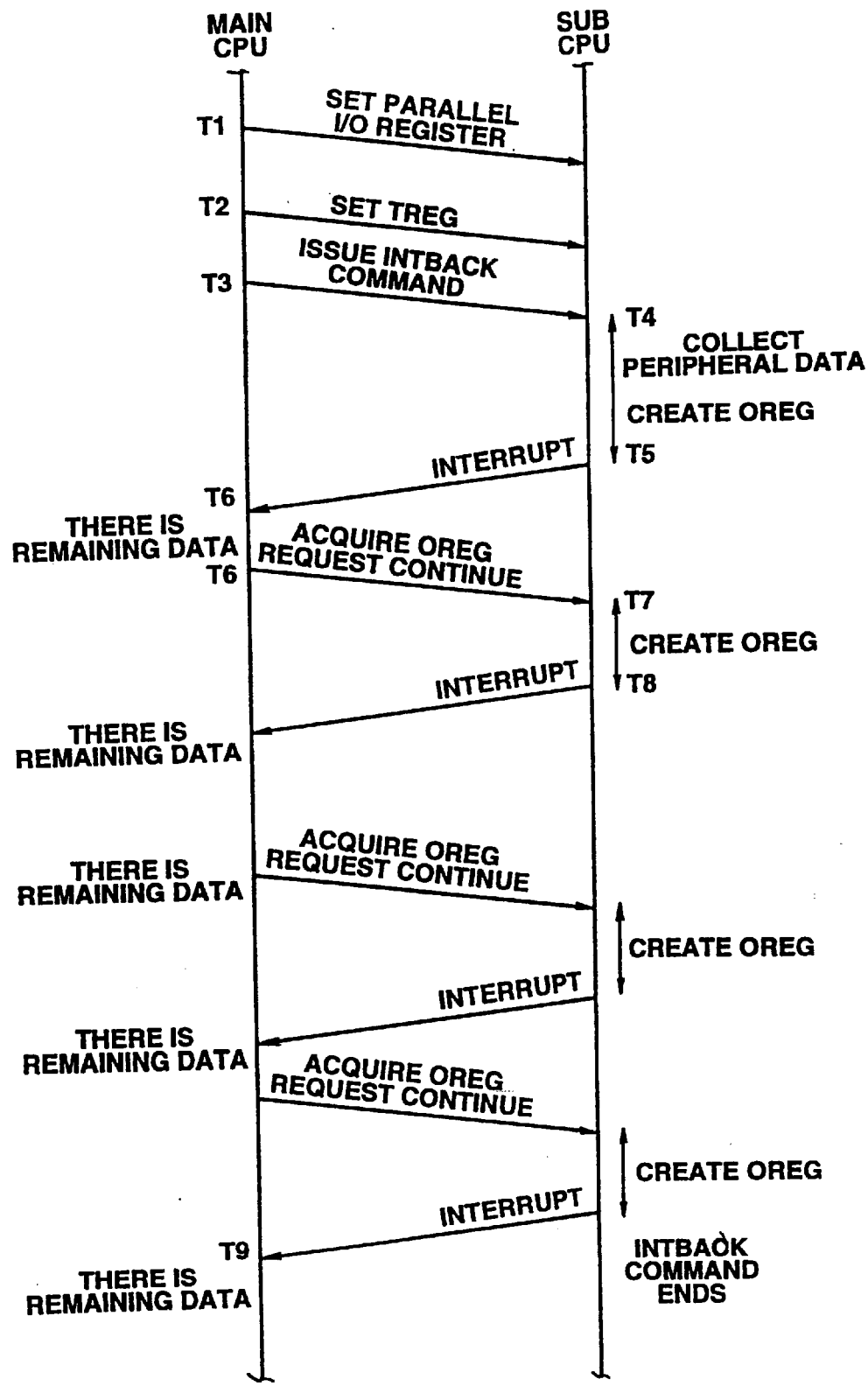
Figure 19:
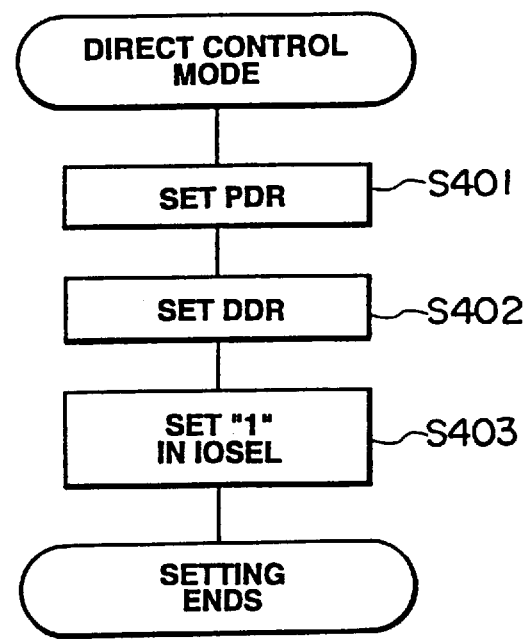
Figure 25:
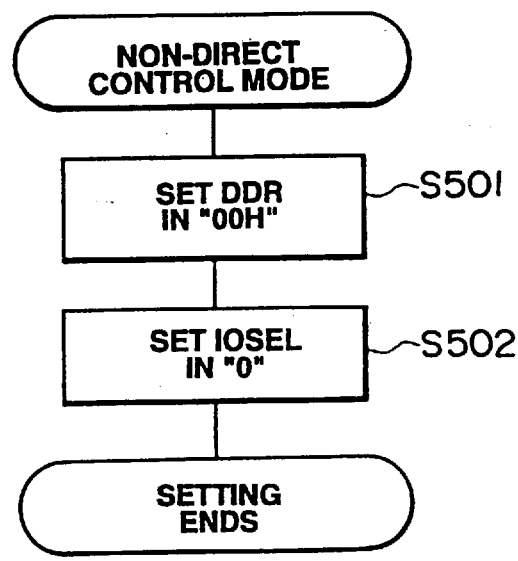
Figure 20:
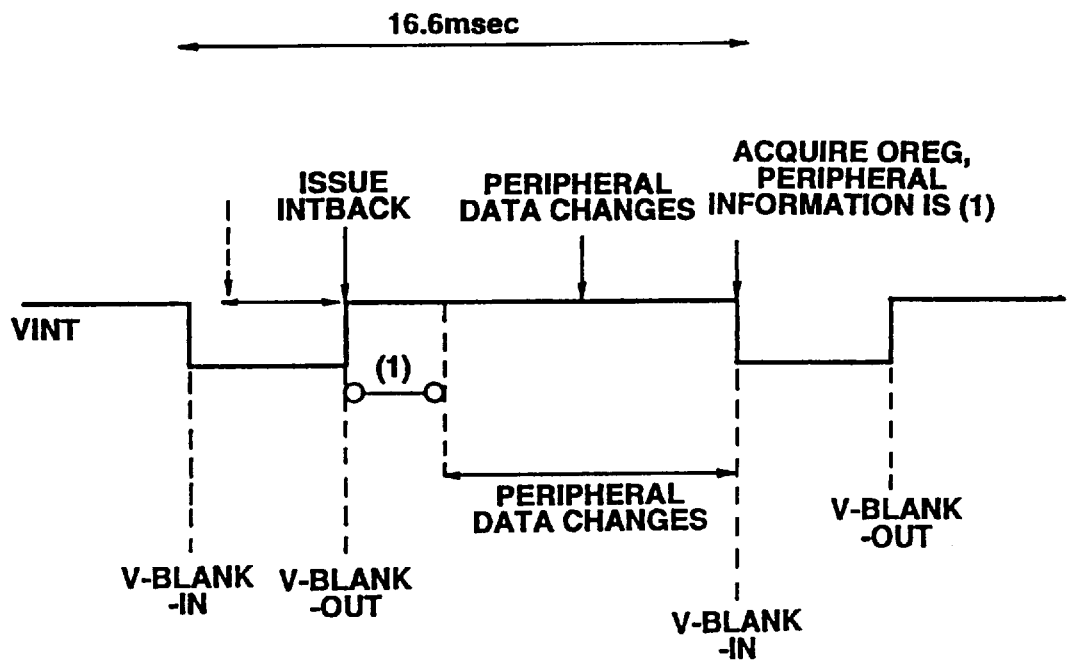
Figure 21:
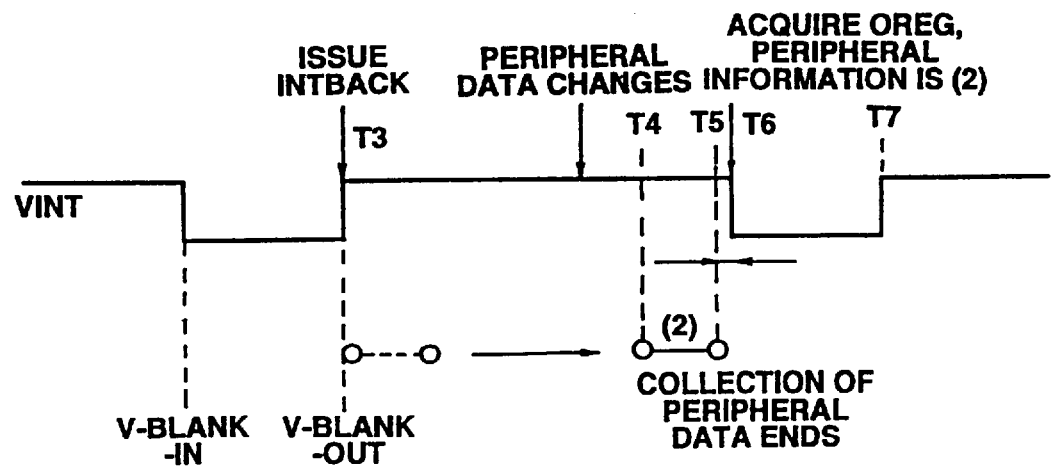
Figure 22:
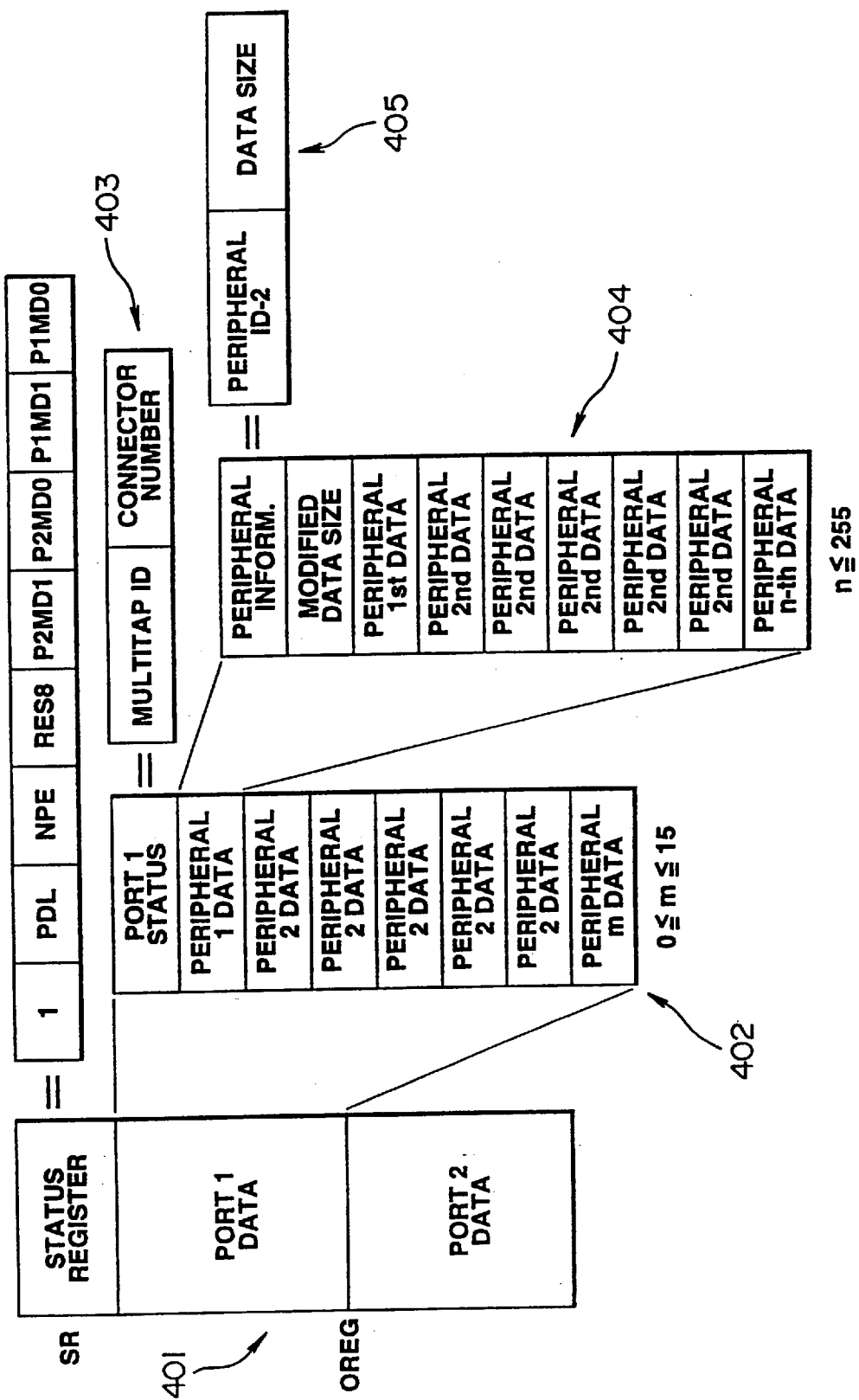
Figure 23:
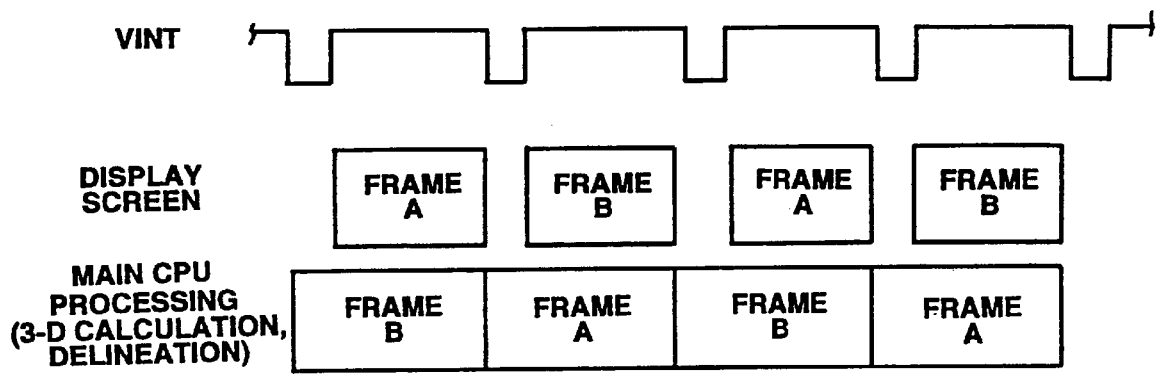
Figure 24:
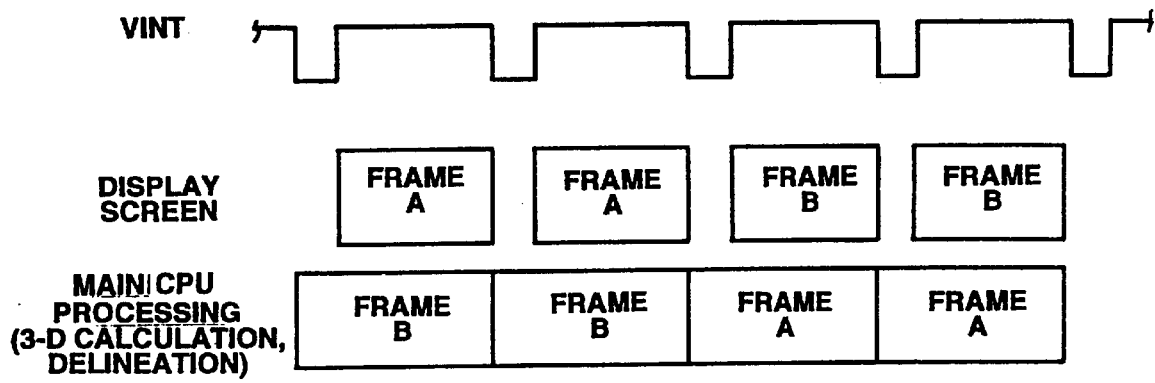
Figure 26:
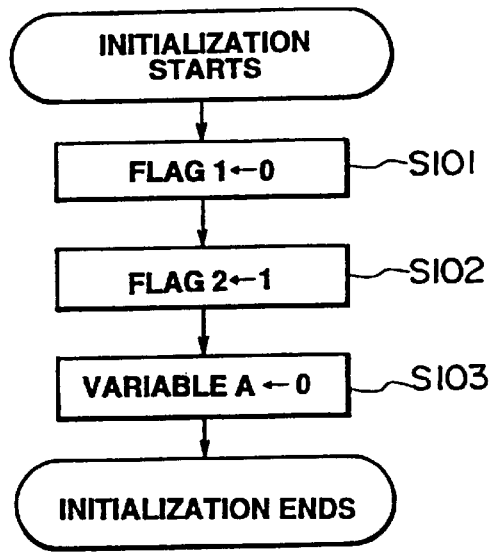
Figure 28:
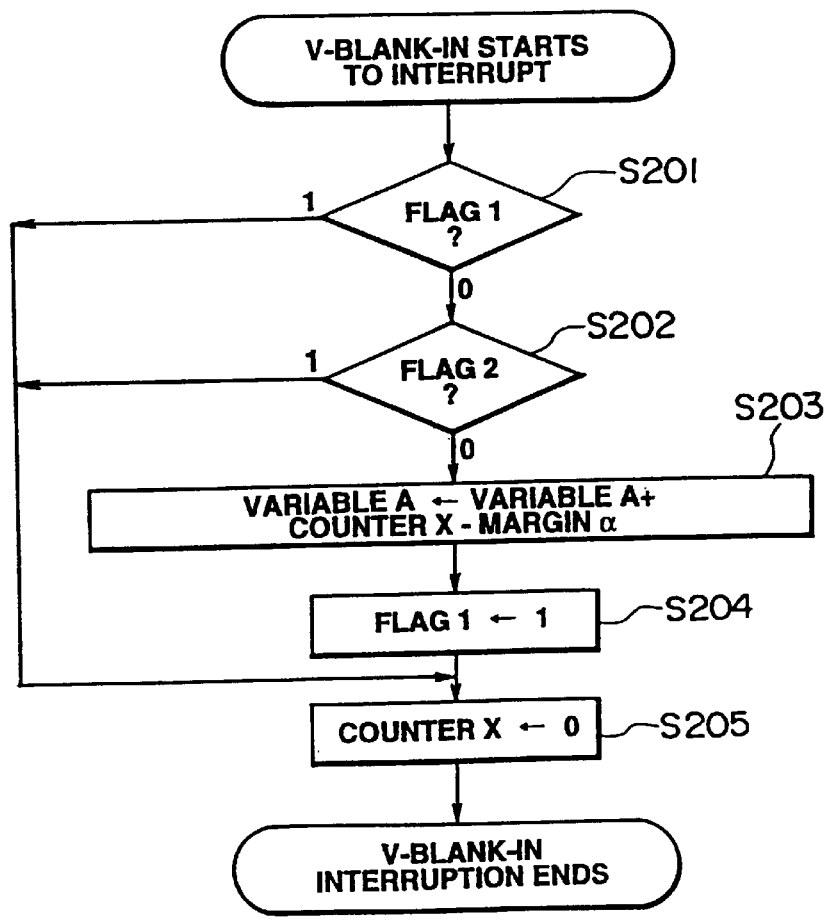
Figure 27:
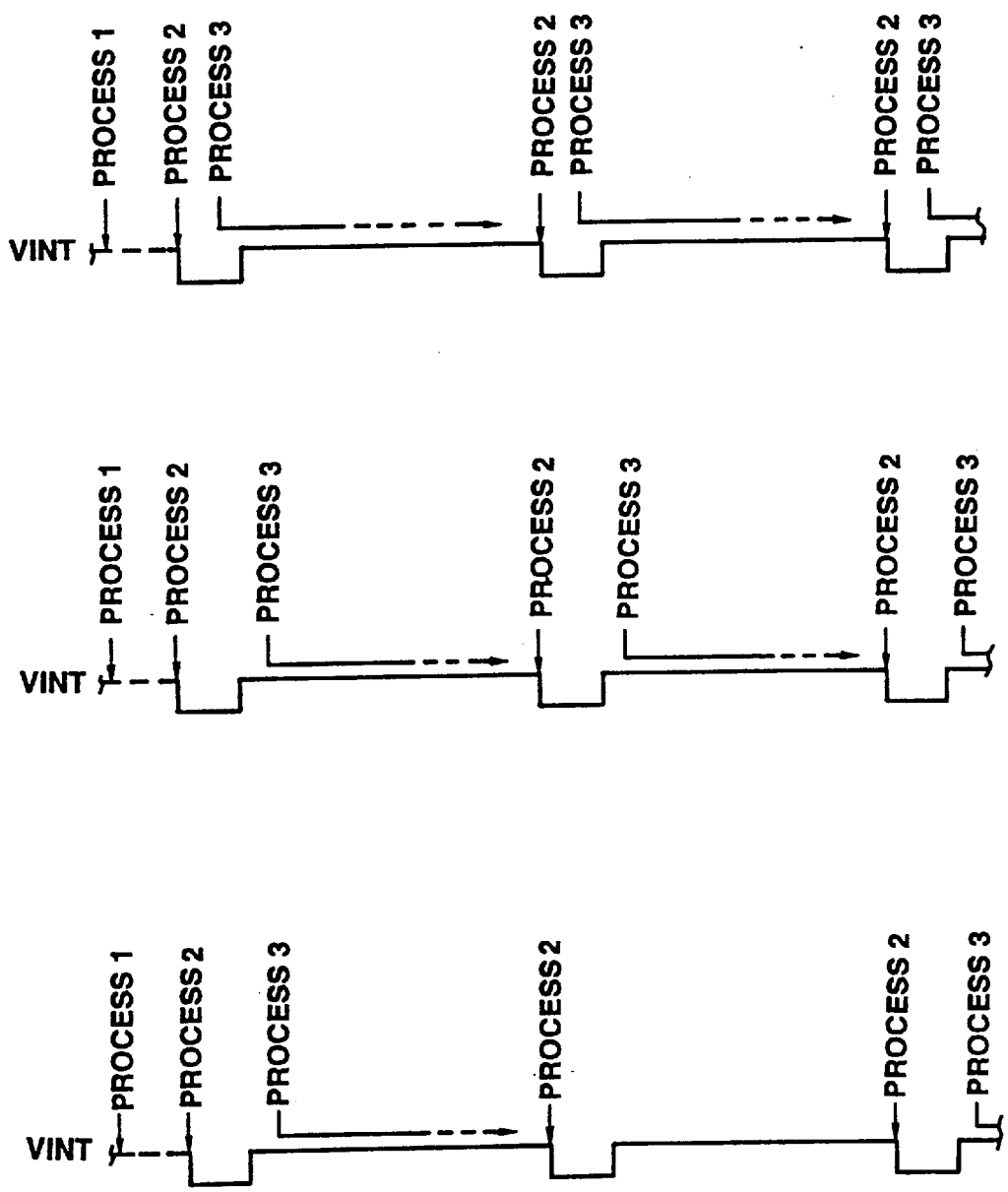
Figure 29:
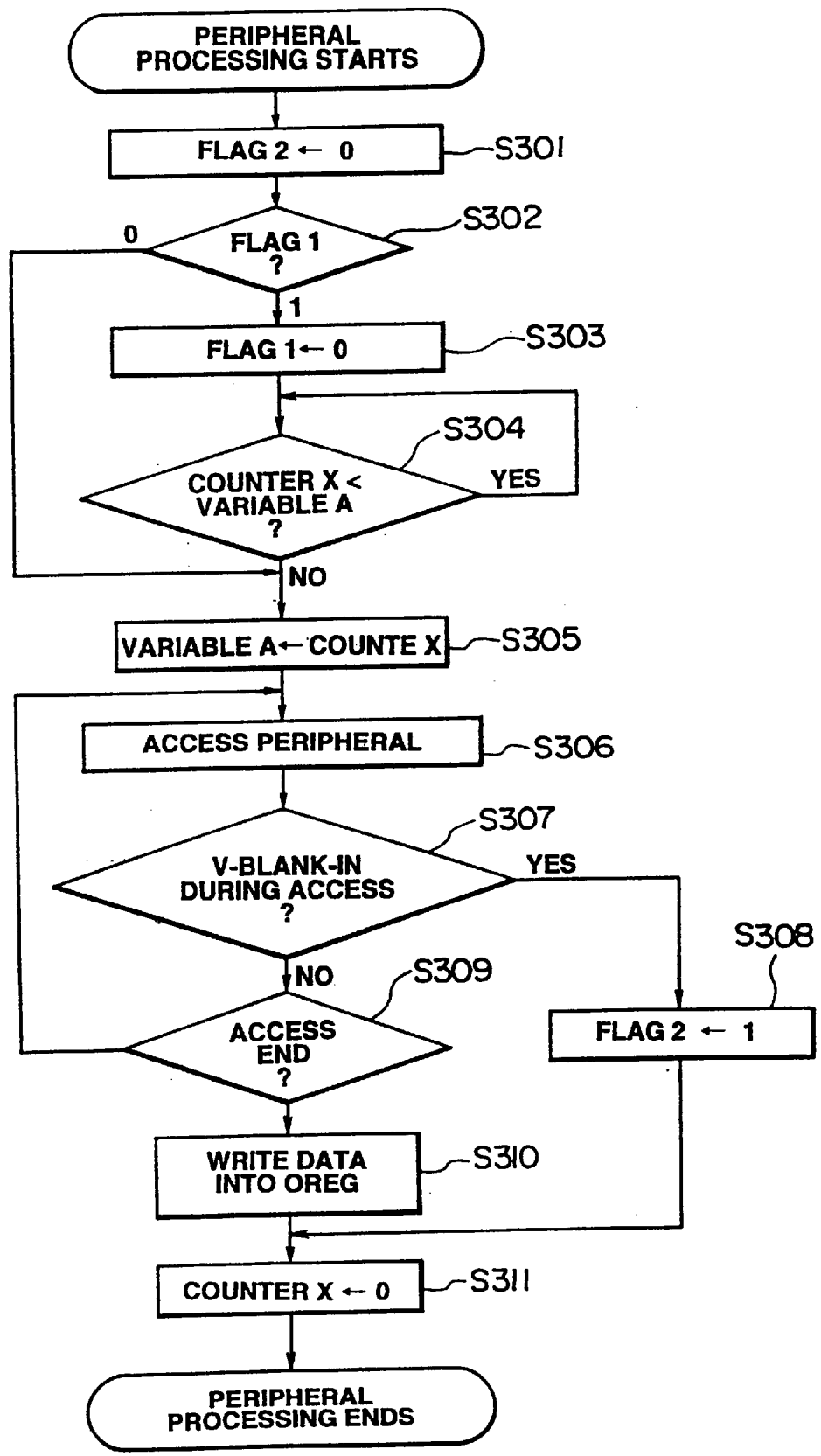
Figure 30:
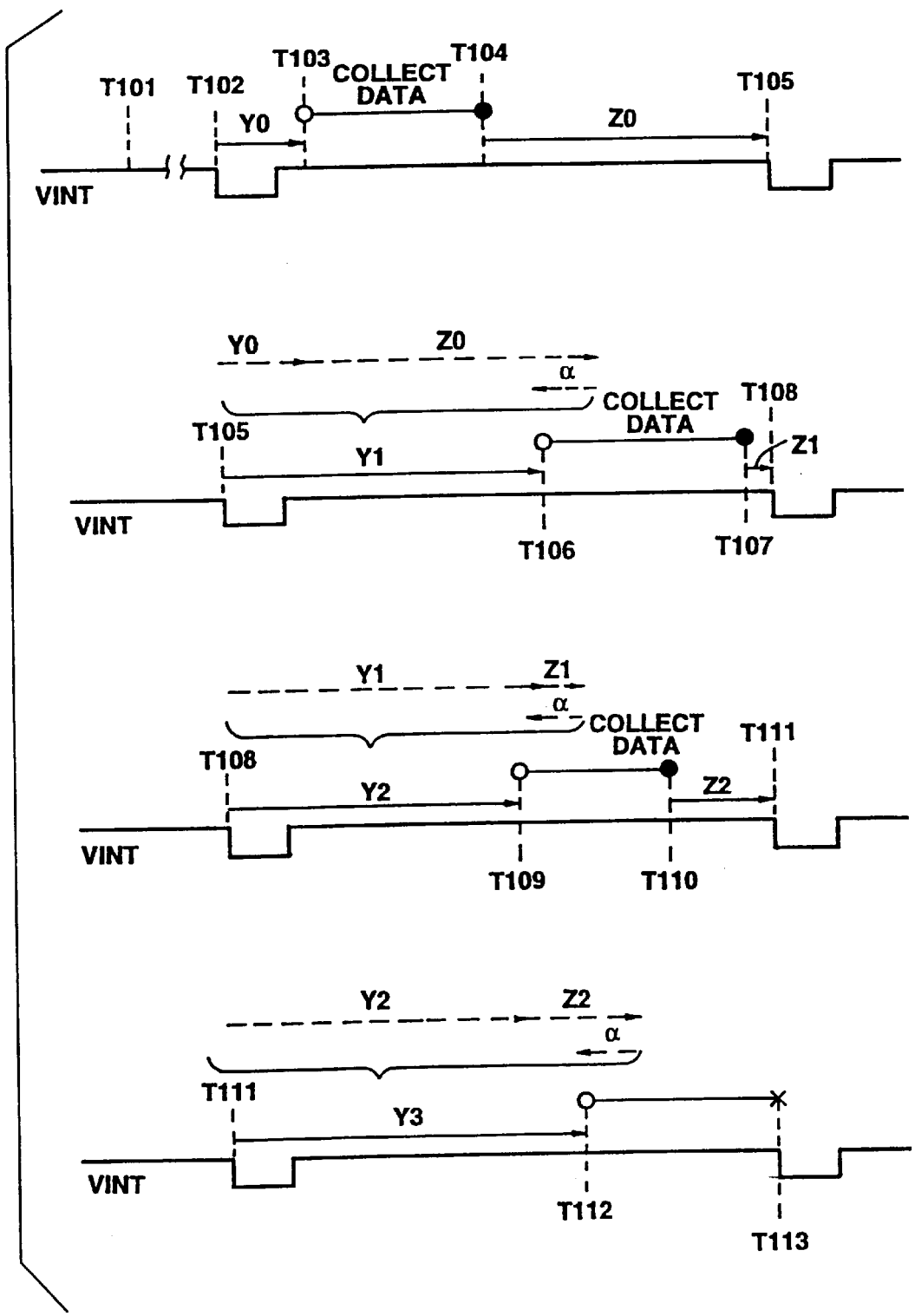
Figure 32A:
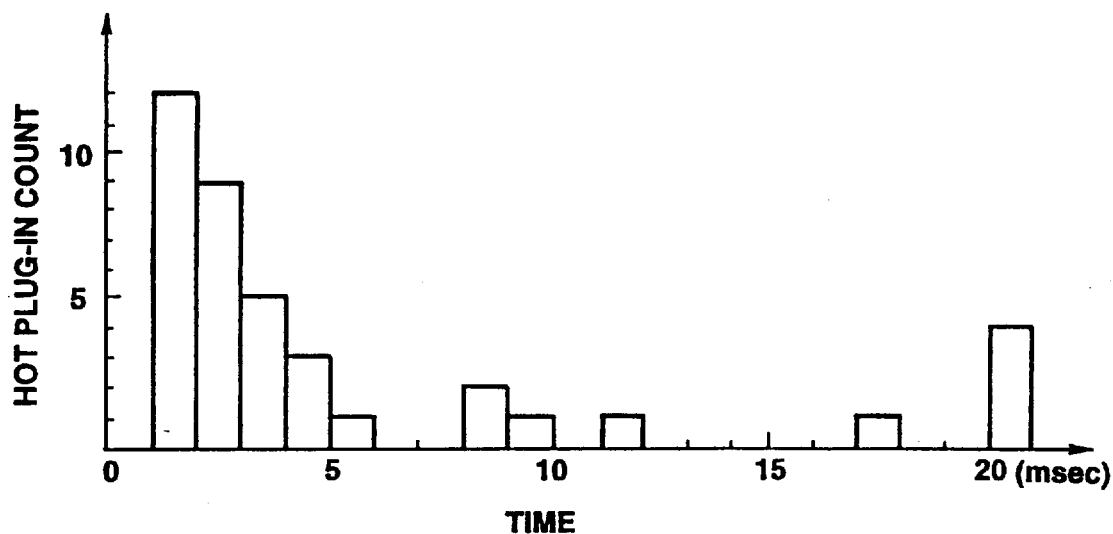
Figure 32B:
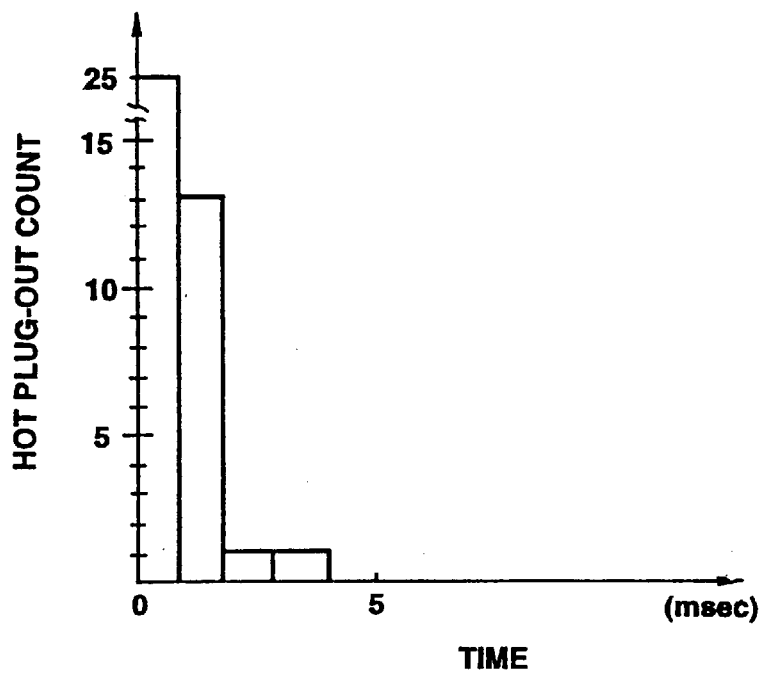

FIGS. to 13A to 13C shows the arrangement of pins of plug connector of peripheral of the embodiment;

FIG. 14 illustrates a TH/TR selection communication mode of the embodiment;

FIG. 15 illustrates a three-wire handshake communication mode of the embodiment;

FIG. 16 illustrates a clocked parallel communication mode of the embodiment;

FIGS. 17A and 17B illustrate a clocked serial communication mode of the embodiment;

FIG. 18 shows a sequence chart indicative of the outline of the operation of a data processing apparatus of the embodiment;

FIG. 19 is a flow chart indicative of the operation of the video game system in a main CPU direct mode;

FIG. 20 is a timing chart in which no optimization of peripheral data collection timing is performed in the embodiment;

FIG. 21 is a timing chart in which optimization of peripheral data collection timing has been performed in the embodiment;

FIG. 22 is a register table in the embodiment;

FIG. 23 is a timing chart indicative of image display and control in the embodiment;

FIG. 24 is a timing chart indicative of image display and control in the embodiment;

FIG. 25 is a flow chart indicative of the operation of the video game system in a subCPU control mode;

FIG. 26 is a flow chart indicative of optimization of peripheral data collection timing in the embodiment;

FIG. 27 is a flow chart indicative of optimization of peripheral data collection timing in the embodiment;

FIG. 28 is a flow chart indicative of optimization of peripheral data collection timing in the embodiment;

FIG. 29 is a flow chart indicative of optimization of peripheral data collection timing in the embodiment;

FIG. 30 is a flow chart indicative of optimization of peripheral data collection timing in the embodiment;

FIG. 31 illustrates determination of a peripheral connection state in the embodiment; and FIGS. 32A and 32B illustrate determination of a peripheral connection state in the embodiment.

DESCRIPTION OF THE PREFERRED EMBODIMENTS (Structure of the Present Embodiment)

Figure 1:
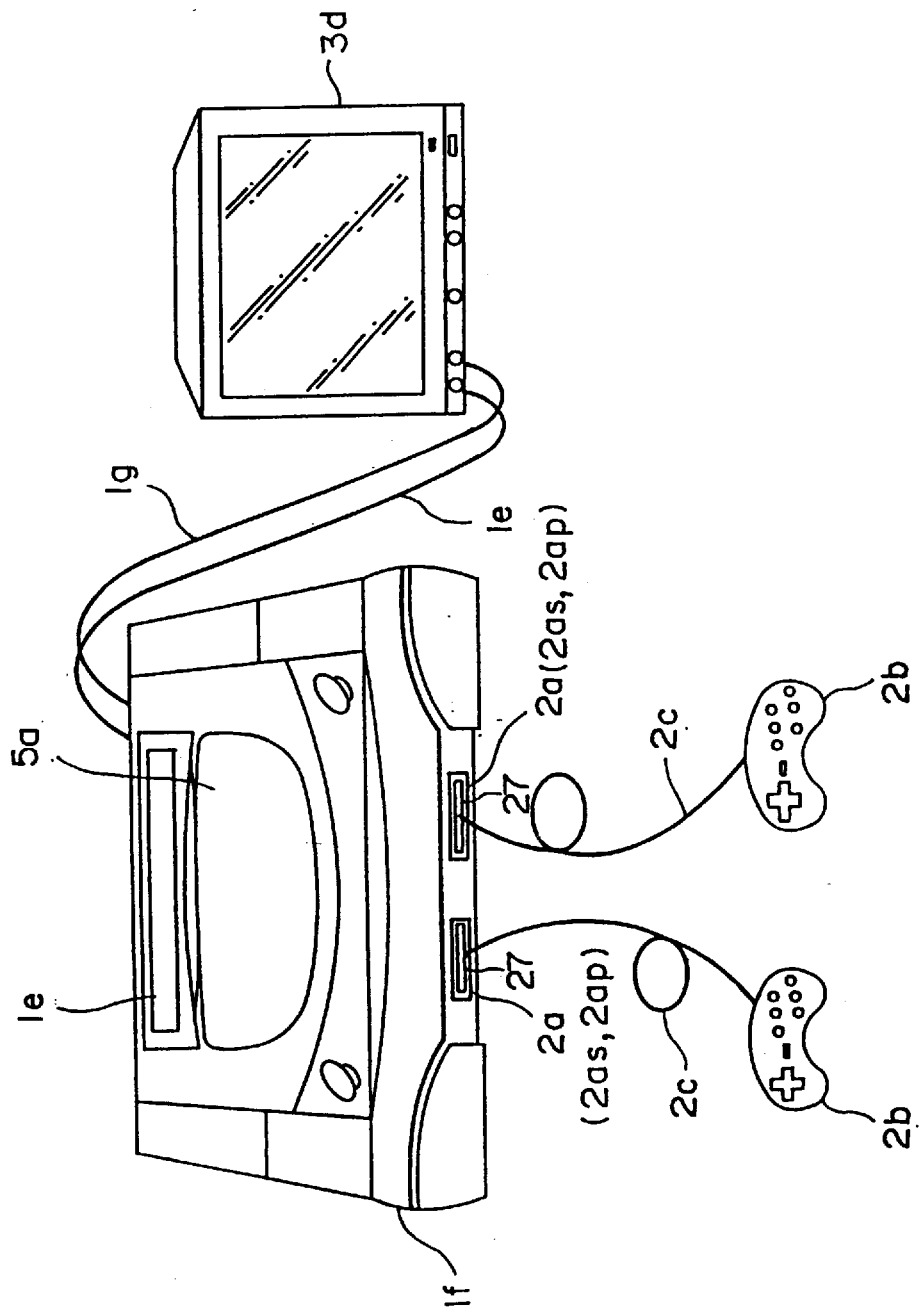
FIG. 1 is a perspective view of a video game system as one embodiment of the present invention.

(1) Whole Structure:

FIG. 1 is a perspective view of a video game system as one embodiment of the present invention. In FIG. 1, reference symbol 1f denotes the data processing apparatus 1f of the video game system which is provided with a pair of two peripheral ports 27 on its front. Each of the peripheral ports 27 has a socket or socket connector 2as with which a plug or plug connector 2ap of a peripheral 2b is removably connected. The plug connector 2ap are connected with peripheral 2b through a cable 2c. The connected combination of socket connector 2as and plug connector 2ap may be referred to as connector 2a hereinbelow. Peripherals 2b include control key switch assemblies such as joypad, joystick, keyboard or mouse. These switch assemblies may also be referred to as a controller. As for the switch assemblies such controllers disclosed in U.S. patent application Ser. No. 08/245,446 may be used.

Provided on an upper surface of the data processing apparatus 1f are a cartridge I/F 1e for connection of a ROM cartridge and a CD-ROM drive 5a for reading a CD-ROM. Provided on the back of the data processing apparatus 1f are a video output terminal and an audio output terminal (not shown). The video output terminal on the side of the data processing apparatus is connected through a cable 1g to a video input terminal of TV set 3d, and the audio output terminal of the video game system is connected through a cable 1h to an audio input terminal of TV set 3d. In such video game system, the user can play a game while viewing a picture appearing on the display screen of the TV set 3d by operating peripherals 2b.

Figure 2:
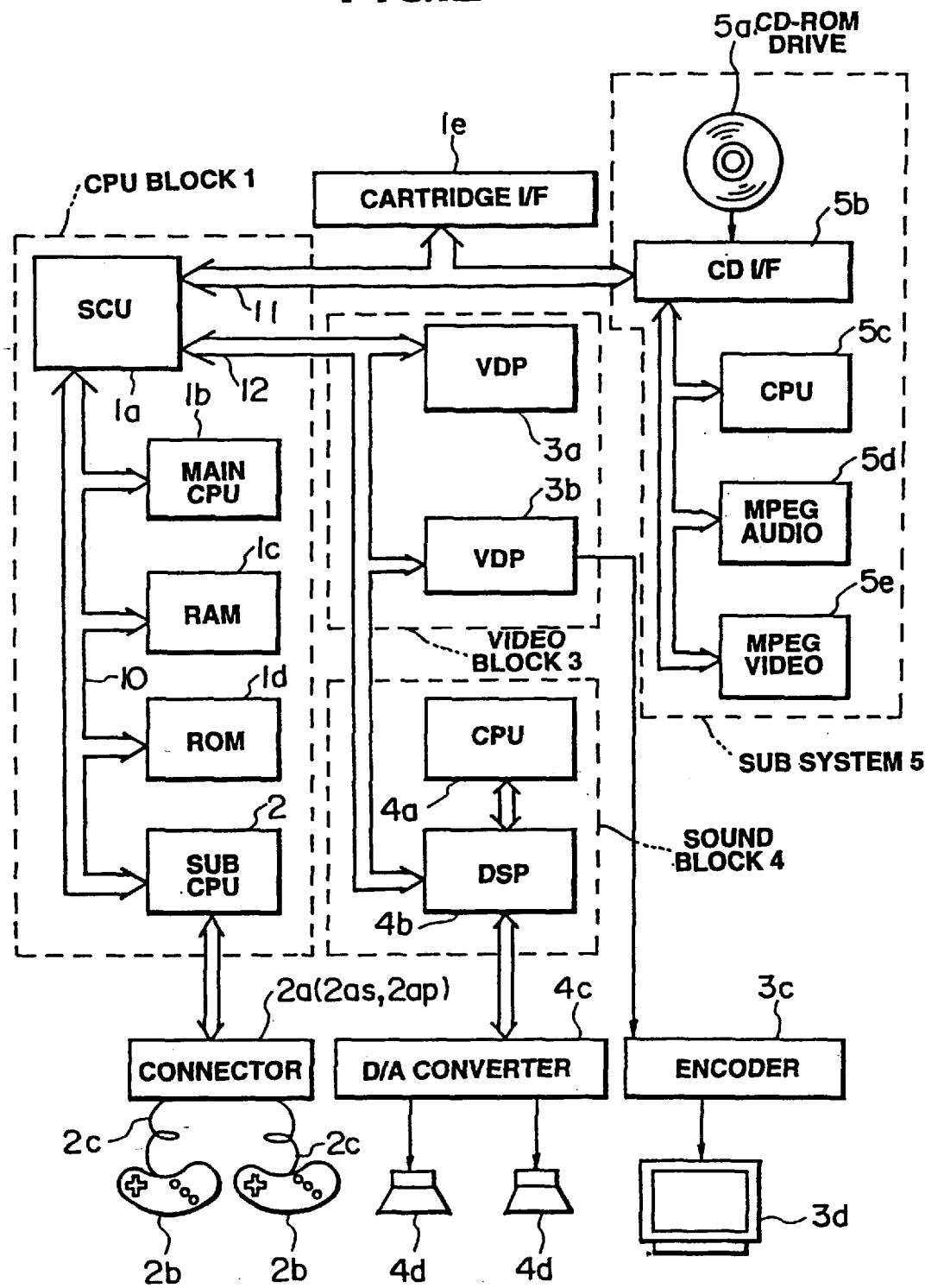
FIG. 2. outlines the video game system as the embodiment.

FIG. 2 is a block diagram indicative of the outline of the video game system of this embodiment. The data processing apparatus is composed of a CPU block 1 which provides control over the whole system, a video block 3 which process video signals and controls a display on the game display screen, a sound block 4 which produces effective sounds, etc., and a subsystem 5 which controls CD-ROM drive 5a and reads a CD-ROM.

CPU block 1 is composed of a SCU (System Control Unit) 1a, main CPU 1b, RAM 1c, ROM 1d, cartridge I/F 1e, subCPU 2, and CPU bus 10. Main CPU 1b controls the whole game system. In order to enhance control capability, main CPU 1b consists of 32-bit RISC types high speed CPUs (two CPU chips called SH-2) and provides an improved, high speed calculating operation which may function similarly as a digital signal processor (DSP). RAM 1c is used as a work area for main CPU 1b. ROM 1d has a written initial program for initializing purposes. SCU 1a smoothly inputs/outputs data between main CPU 1b, VDPs 3a and 3b, DSP 4b, and CPU 5c by controlling buses 10, 11 and 12. SCU 1a has an internal DMA controller which transfers character (sprite) data to a V-RAM in video block 3 during the game to thereby execute application software for a game, etc., at high speed. Cartridge I/F 1e is used to input in position application software fed in the form of a ROM cartridge.

SubCPU 2 is called a SMPC (System Manager & Peripheral Control) which has the function of collecting peripheral data from peripherals 2b through connectors 2a in response to a request from main CPU 1b, which controls an image, for example, so as to revolve an airplane on the game display screen on the basis of peripheral data received from subCPU 2. SubCPU 2 has the functions of automatically recognizing the kinds of peripherals connected to connectors 2a (socket connector terminals) automatically and collecting peripheral data in accordance with a communication mode depending on the kinds of the peripherals used.

The video block 3 is composed of a VDP 3a (Video Display Processor) which delineates characters in the video game, a VDP 3b which delineates the background picture. Data on the images delineated by VDPS 3a, 3b is stored in a frame memory (not shown) and then output to an encoder 3c, which produces a video signal by adding a sync signal, etc., to the image data and outputs the video signal, etc., to the TV set to thereby display the game picture on the TV set. The details of video block 3 may be referred to PCT/JP94/01068 (filed Feb. 24, 1995 in U.S.), PCTIJP94/01067. (filed Feb. 27, 1995 in U.S.), PCT/JP94/01066 (filed Feb. 27, 1995 in U.S.).

Sound block 4 is composed of a DSP 4b which performs voice synthesis in accordance with a PCM or an FM system and a CPU 4a which controls the DSP 4b, and other operations. Voice data produced by DSP 4b is converted by a D/A converter 4c to two channel signals, which are then output to speakers 4d.

Subsystem 5 is composed of a CD-ROM drive 5a, CD I/F 5b, CPU 5c, MPEG AUDIO 5d, MPEG VIDEO 5e, etc. Subsystem 5 reads application software fed in the form of a CD-ROM and reproduces an animation. CD-ROM drive 5a reads data from the CD-ROM. CPU 5c controls CD-ROM drive 5a and corrects possible errors in the read data. The data read from the CD-ROM is delivered through CD I/F 5b, bus 11, SCU 1a to main CPU 1b and used as application software. MPEG AUDIO 5d, MPEG VIDEO 5e restore data compressed in accordance with MPEG (Motion Picture Expert Group) standards. By restoring MPEG compressed data written in the CD-ROM, using MPEG AUDIOS 5d and MPEG VIDEO 5e, the animation is reproduced.

Figure 3:
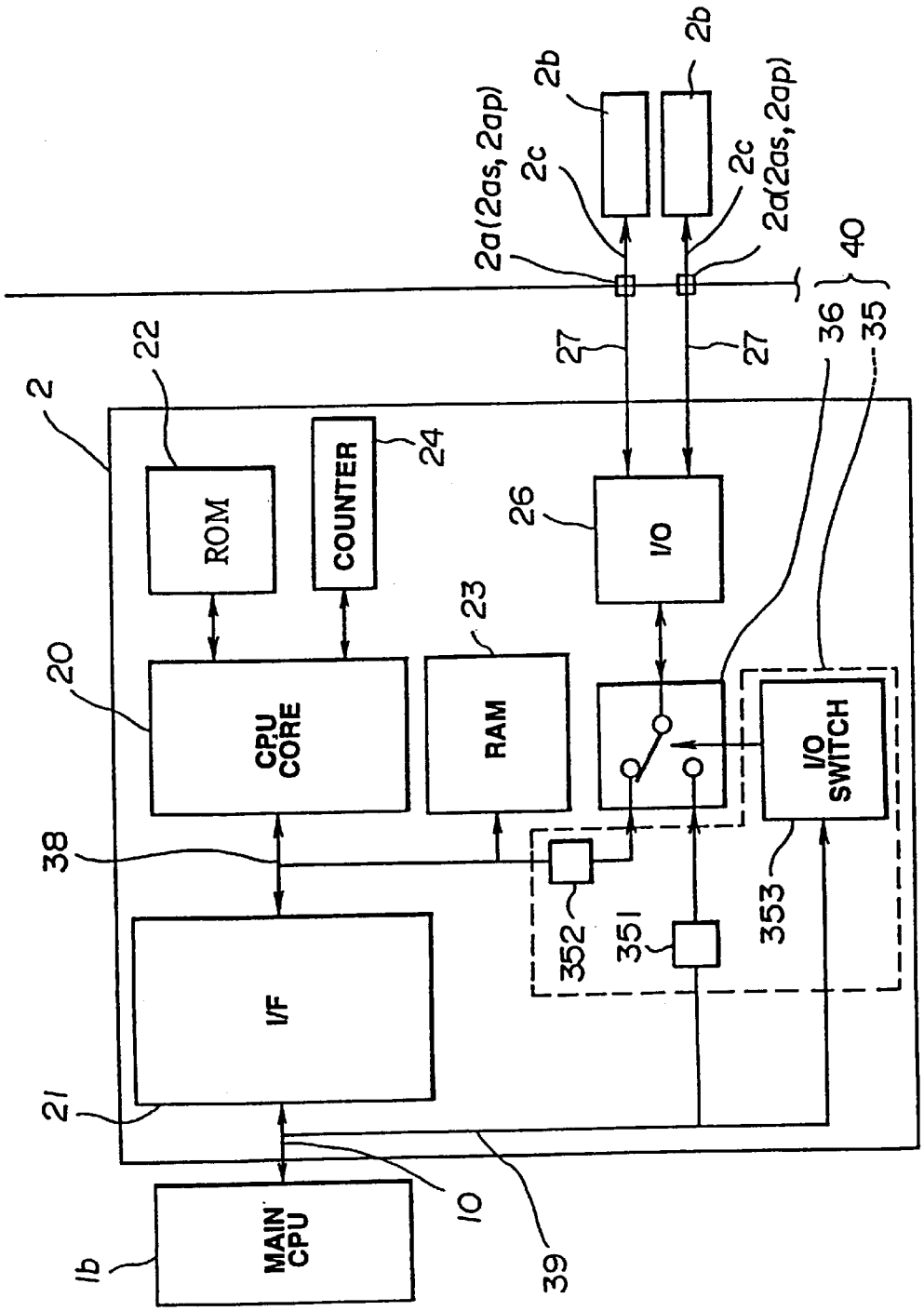
FIG. 3 outlines a subCPU of the embodiment.

(2) Structure of the SubCPU:

FIG. 3 shows the structure of subCPU 2, which is connected through buses 10 including the address and data buses to main CPU 1b, and operates as a subCPU for main CPU 1b. SubCPU 2 is composed of a CPU core 20 which executes commands, etc., delivered from main CPU 1b, I/F 21 including a decoder, ROM22 which has a written program for executing commands, RAM 23 used as a work area, bus line 38, counter 24 which counts clocks, a multiplexer 36 which directly controls I/O interface 26 on the basis of commands from main CPU 1b, data register group 35 which switches multiplexer 36 and I/O interface 26 which has two-channel peripheral ports 27. Multiplexer 36 and data register group 35 compose connection switching means 40 in the present invention. The sub CPU 2 may be formed as an integrated circuit on a semi conductor chip.

Figure 4:
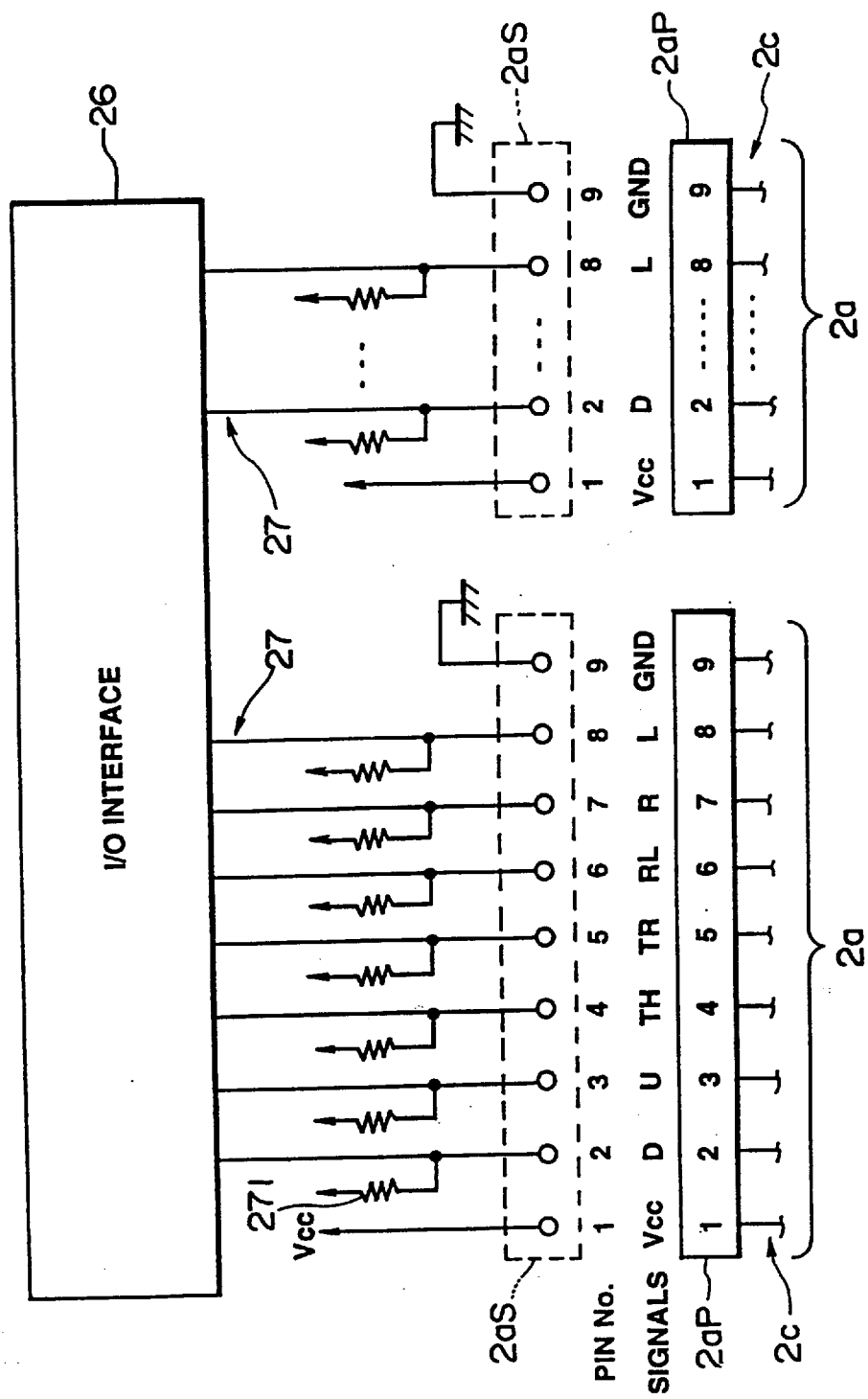
FIG. 4 shows circuitry in the vicinity of peripheral ports of the embodiment.

As shown in FIG. 4 peripherals 2b are electrically connected to subCPU 2 through the connectors 2a and peripheral ports 27 to subCPU 2. By inserting the plug connector 2ap of peripherals 2b into the socket connectors 2as of the data processing apparatus, all the signal lines for peripheral ports 27 are electrically connected to peripherals 2b.

<I/F 21, RAM 23>

RAM 23 is used as a work area for CPU core 20. I/F 21 includes a decoder which decodes the address and data buses. A register table (not shown) which provides input/output of data between main CPU 1b and subCPU 2 is provided in I/F 21. Thus, main CPU 1b is able to access the register table by accessing a predetermined address through CPU bus 10.

Figure 5:
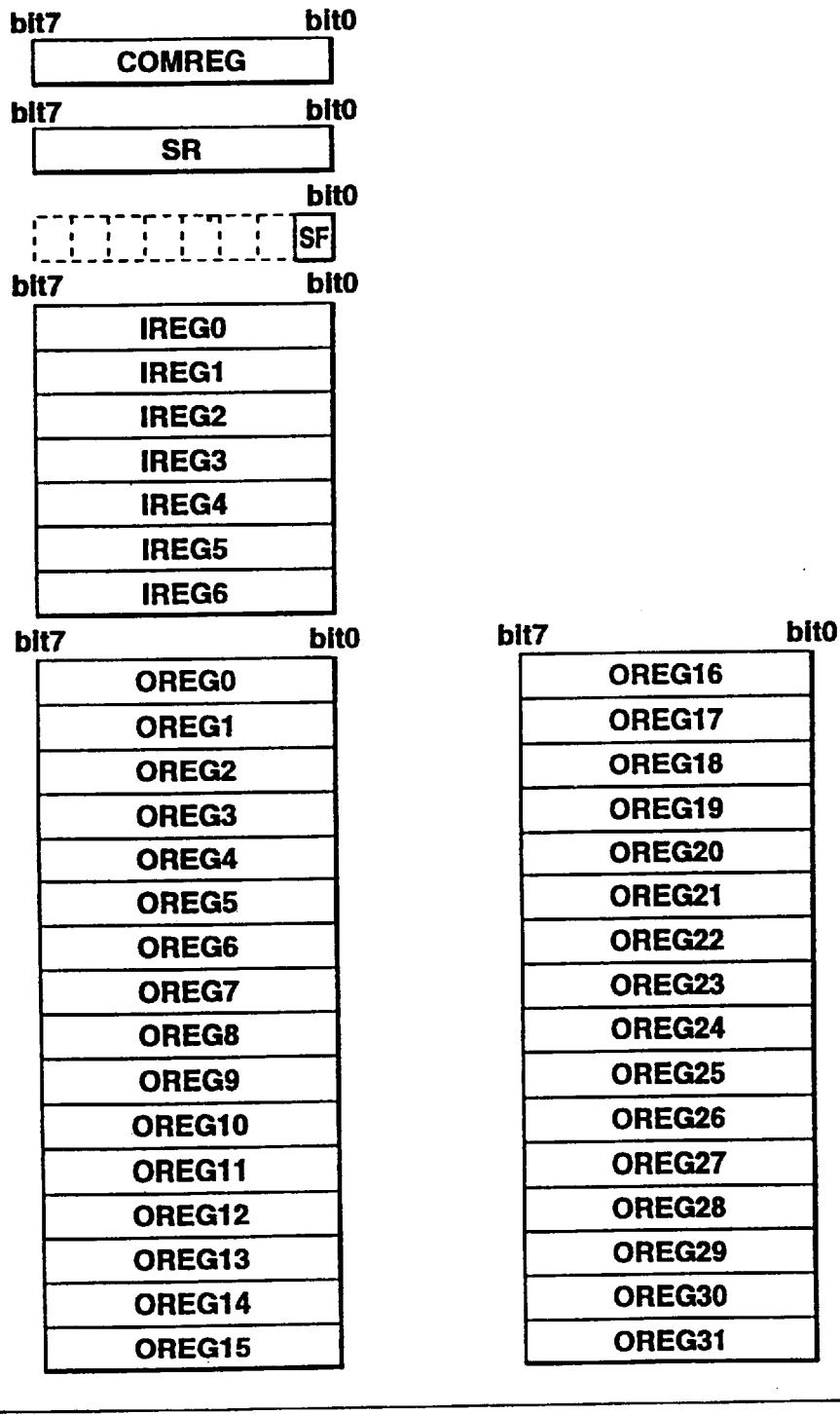
FIG. 5 is a register table in the embodiment.

FIG. 5 shows one example of the register table. In FIG. 5, a command register (COMREG) is used to transfer a command from main CPU 1b to subCPU 2 and a 8-bit write only register as viewed from main CPU 1b. For example, when main CPU 1b has written "10H" as an interrupt back command (INTBACK) into the command register, CPU core 20 collects peripheral data in accordance with the command. A status register (SR) indicates the operative state of subCPU 2 after the command has been executed. For example, it shows the state of use of the two channel I/O ports, and the presence/absence of the remaining peripheral data which has not been transmitted to main CPU 1b. The status register is a read only register as viewed from main CPU 1b.

The status flag (SF) indicates whether subCPU 2 is under execution of a command or capable of receiving a command. A numeral "1" in the status flag indicates that subCPU 2 is busy (under execution of a command) while "0" indicates that subCPU 2 is capable of receiving a command. Main CPU 1b sets (writes "1" in) the status flag before it writes the command into the command register. When subCPU 2 completes the execution of the command, subCPU 2 resets the status flag (writes "0" in the status flag). After confirming that the subCPU 2 has been put in a state where it is capable of executing a command (the status flag is "0"), main CPU 1b gives a command to subCPU 2.

Input registers (IREG0–IREG6) each are a 7-byte register which gives a command parameter inherent to the command from main CPU 1b to subCPU 2, and are a write only register as viewed from main CPU 1b.

Output registers (OREG0–OREG31) each store data which is transferred from subCPU 2 to main CPU 1b. For example, peripheral data, data on the kinds of peripherals, etc., collected by subCPU 2 are written into the output registers. Thus, by accessing the output registers, main CPU 1b is able to obtain peripheral data. The output registers each are a read only register as viewed from main CPU 1b.

<Multiplexer 36>

Multiplexer 36 determines which of CPU core 20 and main CPU 1b should access I/O interface 26. The switching of multiplexer 36 is performed by data register group 35.

Normally, multiplexer 36 is in a state as shown in FIG. 3 and I/O interface 26 is accessed by CPU core 20. Like this, a state where subCPU 2 obtains peripheral data in accordance with a command from main CPU 1b is called a "subCPU control mode".

The following problems may arise depending on a subCPU control mode. When peripherals 2b which requires high speed access are used, CPU core 20 which is low in operation speed can not access the peripheral data. Since an access protocol for peripheral 2b is stored in ROM 22, the access protocol is difficult to change. Thus, although subCPU 2 is able to access a peripheral 2b which is beforehand supposed to be used, it cannot access a peripheral 2b which is not supposed. In order to solve such problem, the present invention is intended to provide a data processing apparatus which achieves high speed image processing, diverse image processing, and optimizes peripheral control.

By directly accessing peripherals 2b in those cases, using main CPU 1b which is capable of performing high speed operations and which is of high flexibility, the peripheral data is obtained. Like this, a state where main CPU 1b directly accesses a peripheral is called a "main CPU direct mode".

<I/O interface 26>

Figures 6, 7:
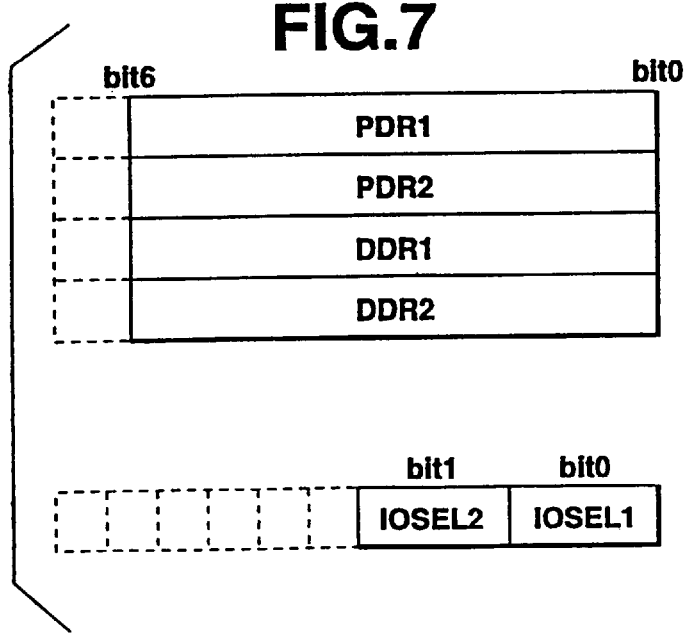
FIG. 6 shows the names of signal lines of a peripheral port of the embodiment.
FIG. 7 shows a data register group of the embodiment.

I/O interface 26 has two-channel peripheral ports 27 each composed of seven signal lines and power source line Vcc and ground line GND. The respective names and functions of the signal lines are shown in FIG. 6. As shown, reference characters TH, TR and TL denote signal lines mainly used as control lines; R, L, D and U denote signal lines used mainly as data output lines extending from the peripherals to I/O interface 26. As will be described later, the directions of input/output of those signal lines are freely settable in dependence on the kinds of peripherals connected to the data processing apparatus. In communication modes other than clocked parallel and serial communication modes, those signal lines TR, TL can be used as data lines.

The setting of the directions of the input/output of the signal lines is performed by accessing data registers 35 (FIGS. 3, 7) provided in the subCPU 2. Data direction registers (DDR1, DDR2) of the data register group are each a 7-bit register which is capable of setting the input/output directions of the respective signal lines of peripheral port 27 of each channel. For example, when main CPU 1b has written "0" in each of the bits of the data direction registers through CPU bus 10, the respective signal lines are set for data input while when main CPU 1b has written "1", the respective signal lines are set for data output. Thus, access to the various peripherals is achieved.

Port data registers (PDR1, PDR2) of the data register group are each a 7-bit register in which data in the peripheral port 27 of each channel is stored. When peripheral port 27 has been set for data output, the data can be output to the peripheral port 27 by writing the data into the port data register. When peripheral port 27 is set for data input, the state ("0" or "1") of the terminal of the peripheral port 27 can be read by reading data in the port data register.

I/O selection registers (IOSEL1, IOSEL2) are each a flag which determines which of subCPU 2 and main CPU 1b should access peripheral port 27. When "0" has been written into the I/O selection register, subCPU 2 is capable of accessing peripheral port 27. When "1" has been written into the I/O selection register, main CPU 1b is capable of accessing peripheral port 27.

<Data Register Group 35>

The specified structure of data register group 35 is shown in FIGS. 3 and 8. In FIG. 3, data register group 35 is connected through a multiplexer 30 to I/O interface 26. Data register group 35 mainly include a register group 351 for main CPU 1b, register group 352 for subCPU 2 and I/O selection register 353.

One terminal of register group 351 for main CPU 1b is connected to main CPU 1b through bus lines 39 and 10. The other terminal of register group 351 is connected to one terminal of multiplexer 36.

One terminal of register group 352 for CPU core 20 is connected through a bus line 38 to CPU core 20. The other terminal of registers 352 is connected to the other terminal of multiplexer 36.

A common terminal of multiplexer 36 is connected to I/O interface 26, which, in turn, is connected to peripheral connectors 2a. Connected to peripheral connectors 2a are two corresponding peripherals 2b such as joypads through peripheral ports 27.

Multiplexer 36 connects peripheral 2b to CPU core 20 through register group 352 and bus line 38 or connects through register group 351 and bus lines 39 and 10 to the main CPU 1b in accordance with setting of I/O selection register 353 of data register group 35.

While in FIG. 3 data register group 35, multiplexer 36 and I/O 26 are illustrated as being composed of circuitry for two channels, only elements for one channel will be described below.

FIG. 8 is a block diagram indicative of a specified structure of connection switching means 40. In FIG. 8, main CPU 1b and its bus line 10, connection switching means 40, CPU core 20 and bus line 38 in subCPU 2 are shown.

Bus line 10 connected to main CPU 1b is composed of an address bus 101, control bus 102 and data bus 103. Address bus 101 and control bus 102 are connected to a decoder 251 of subCPU 2 through a decoder 264. Address data is fed from the address bus 101 to decoder 251.

Register group 351 is composed of 6-bit port data registers (PDR1, 2) 355, 6-bit port data direction registers (DDR1, 2) 356, and 6-bit port data register 357.

Data from data bus 103 is written into port data registers 355 and data direction registers 356. The output of decoder 251 is connected to port registers 355, data direction registers 356, port data register 357 and I/O selection register group (IOSEL1, 2) 353. One of those registers is selected by the designation of the decoder 251.

Register group 352 is composed of a 6-bit port data register 358, 6-bit data direction register 359 and 6-bit port data register 360.

A bus line 38 connected to CPU core 20 is composed of an address bus 381, control bus 382 and data bus 383. Data bus 383 is connected to port data register 358, data direction register 359 and port data register 360. Address bus 381 and control bus 382 are connected to decoder 252, the output of which is connected to port data register 358, data direction register 359 and port data register 360. One of those registers is selected by the designation of the decoder 252.

Multiplexer 36 is composed of three-state buffers 361–365, which are assumed to have stored required bit data. The output terminal of I/O selection register group 353 is connected to non-inverting control input terminals of buffers 361 and 363 and inverting control input terminals of buffers 362 and 364. When the output terminal of I/O selection register group 353 is "1", buffers 361, 363 are open while when the output terminal of I/O selection register group 353 is "0", buffers 362 and 363 are open.

The output terminal of port data register group 355 is connected to an input terminal of buffer 361; the output terminal of data direction register group 356 is connected to an input terminal of buffer 363; the output terminal of port data register 358 is connected to an input terminal of buffer 362; and the output terminal of data direction register 359 is connected to an input terminal of buffer 364.

The output terminals of buffers 361, 362 are connected together to an input terminal of buffer 365. The non-inverting control input terminal of buffer 365 is connected to output terminals of buffer 363, 364 so as to control opening/closing buffer 365, the output terminal of which is connected to I/O 26 and port data registers 351, 360.

FIG. 9 shows a truth table (as viewed from main CPU 1b) for the respective registers in FIG. 8 and explains a state where the right of access to I/O 26 has been transferred to CPU core 20 when I/O selection register 353 has been set at "0". In this case, FIG. 9 also shows that the direction of I/O interface 26 is in an input state irrespective of the value of data direction register group 356 and that the states of the buffers, etc., are determined by subCPU 2 irrespective of the value of port data register group 355. The table further indicates that when the input state of I/O interface 26 is in any one of 8 upper states of FIG. 9, it can be read through port data register 357.

<Peripheral Port 27>

FIG. 4 shows circuitry in the vicinity of peripheral ports 27. As described above, I/O interface 26 has two-channel peripheral ports 27. Signal lines D, U, TH, TR, TL, R and L of respective peripheral ports 27 are pulled up through corresponding resisters 271 to power supply Vcc. Thus, when no peripherals are connected to the signal lines, the voltage of the signal lines are at Vcc ("1"). Thus, when the signal lines (for example, R, L, D, U) set for data input are all at "1", subCPU 2 determines that no peripherals have been connected to the peripheral ports 27.

<Peripherals>

The kinds of peripherals are large; controller or joypad (PAD), mouse, keyboard, etc., and, thus, processing such as communication depending on the kinds of the respective peripherals is required to be performed. In the present embodiment, the kind of peripherals is expressed by two peripherals ID-1, 2 to thereby automatically recognize the connected peripherals. Peripheral ID-1 is used to cause subCPU 2 to determine a communication mode, etc. This peripheral ID-1 is not transferred to main CPU 1b. Peripheral ID-2 is used to cause main CPU 1b to execute image processing depending on the kind of the peripheral. Thus, this peripheral ID-2 is read from the peripheral concerned and then transferred to main CPU 1b.

The relationship between peripheral ID-1 and peripheral name is shown in FIG. 10, in which the value of peripheral ID-1 is determined by the respective values of signal lines R, L, D, U when subCPU 2 outputs "1" to signal lines TH, and the respective values of signal lines R, L, D, U when subCPU 2 outputs "0" to signal line TH. That is, peripheral ID-1 is specifically calculated in accordance with the following expressions and is of 4 bits:

Peripheral ID-1
={(R when TH=1) or (L when TH=1)}×8h
+{(D when TH=1) or (U when TH=1)}×4h
+{(R when Th=0) or (L when TH=0)}×2h
+{(D when TH=0) or (U when TH=0)}×1h, where h represents the suffix for hexadecimal number.

SubCPU 2 is capable of automatically recognizing the peripheral by referring to peripheral ID-1 and determining a communication mode corresponding to the recognized peripheral ID-1. For example, when the value of peripheral ID-1 is "Bh", subCPU 2 determines that the peripheral connected to peripheral port 27 is a control PAD. For example, when the value of peripheral ID-1 is "3h", subCPU 2 determines that the peripheral connected to peripheral ports 27 is a mouse. In addition, for example, when the value of peripheral ID-1 is "Dh", subCPU 2 determines that the peripheral connected to peripheral port 27 is a "3TRG/6TRG/PAD" (PADS of 3/6 buttons). In addition, for example, when the value of peripheral ID-1 is "7h", subCPU 2 determines that the peripheral connected to peripheral port 27 is a "4P adapter for connection of a plurality of peripherals".

Signal line TR is used as an output line in some of the peripherals, so that when the signal line TR of the peripheral has a low impedance (output), there is a possibility that I/O interface 26 or a device on the side of the peripheral concerned may be broken. In order to avoid this undesirable situation, when the values of signal lines R, L, D and U are read to calculate peripheral ID-1, signal line TR is preferably placed in a state of high impedance and pulled up to high level.

Peripheral ID-2 is data output from the peripheral in the communication after the communication mode has been determined. The peripheral ID-2 is transferred to main CPU 1b through the output register and referred to in the image control by main CPU 1b. The relationship between peripheral ID-2 and peripheral name is shown in FIG. 11. For example, when the value of peripheral ID-2 is "1h", main CPU 1b determines that the peripheral is an analog device such as a joystick. At this time, the value of peripheral ID-1 becomes "5h" indicating that the peripheral outputs peripheral ID-2. That is, only when peripheral ID-1 is "5h", the peripheral outputs peripheral ID-2.

As described above, by using two peripherals ID-1, 2, a peripheral for a video game system different in type from another one can be used in the latter video game system. For example, assume that a peripheral ID-1 is allocated to a conventional type peripheral. In this case, by allocating a peripheral ID-2 in addition to ID-1 to a new type of peripheral, the new type of peripheral can use both the new and old types of peripherals. Thus, according to the present embodiment, a new type of peripheral can be developed while still maintaining the compatibility of the peripheral with another.

<Communication Mode between a Peripheral Port and a Peripheral>

SubCPU 2 makes communication in accordance with the following communication mode in dependence on the kind of peripheral. As described above, the communication mode is determined by the value of peripheral ID-1.

For example, when the value of peripheral ID-1 is "Dh", subCPU 2 determines that the peripheral connected to peripheral port 27 is "3TRG/6TRG PAD". In this case, a parallel communication mode depending on the peripheral "3TRG/6TRG PAD" is selected by subCPU 2. When the value of peripheral ID-1 is "Bh", subCPU 2 determines that the peripheral connected to peripheral port 27 is a control PAD. In this case, a TH/TR selection communication mode to be described later is determined by subCPU 2 in accordance with peripheral ID-1 (=Bh).

When the value of peripheral ID-1 is "5h", any one of the three-wire handshake communication mode, and clocked parallel and serial communication mode is determined on the basis of a correspondence table of FIG. 12, which shows the relationship between the respective signal lines and communication modes. For example, in the case in which when subCPU 2 outputs TH=1 and TR=1, the peripheral outputs R=0, L=0, D=0 and U=1 and in the case in which when subCPU 2 outputs TH=0 and TR=1, the peripheral outputs R=0, L=0, D=0 and U=1, the three-wire handshake communication mode is selected by subCPU 2. In the case in which when subCPU 2 outputs TH=1 and TR=1, the peripheral outputs R=0, L=0, D=1, and U=0 and in the case in which when subCPU 2 outputs TH=0 and TR=1, the peripheral outputs R=0, L=0, D=1, and U=0, the clocked serial communication mode is selected. In the case in which when subCPU 2 outputs TH=1 and TR=1, the peripheral outputs R=0, L=0, D=1, and U=1 and in the case in which when subCPU 2 outputs TH=0 and TR=1, the peripheral outputs R=0, L=0, D=1, and U=1, the clocked parallel communication mode is selected by subCPU 2.

In the peripherals based on the clocked serial communication system, preferably, signal lines R, L are connected to GND and signal line D is connected to power supply Vcc as shown in the pin configuration of plug connector 2ap in FIG. 13C. Thus, wrong selection of a communication mode is prevented. After the determination of the communication mode, subCPU 2 accesses a peripheral in accordance with the appropriate communication system.

Subsequently, the details of the TH/TR selection communication mode, three-wire handshake communication mode, and clocked parallel and serial communication modes will be described next.

FIG. 14 illustrates the TH/TR selection communication mode, which is used mainly in the peripherals such as control PAD. In FIG. 14, "RIGHT", "LEFT", "DOWN", "UP", "START", "TRG-A to C", "TRG-L", "TRG-R" and "TRG-X to Z" express data on the respective keys provided in the control PAD. In this communication mode, signal lines TH, TR are set for data output (for transmission of signals from I/O interface 26 to the peripherals). Signal lines TL, R, L, D and U are set for data input (for transmission of signals from the peripherals to I/O interface 26). As shown in FIG. 14, by sequentially changing the states of signal lines TH, TR on the side of subCPU 2, the peripheral outputs first-fourth data sequentially onto signal lines R, L, D and U. Thus, the subCPU 2 reads data output onto the respective signal lines R, L, D and U to collect peripheral data (on the states of keys of the control PAD). The collected peripheral data is delivered through the output register to main CPU 1b.

When the peripheral 2b adopts the TH/TR selection communication mode, its plug connector 2ap has a pin configuration of nine pins each electrically separated from each other as shown in FIG. 13A.

FIG. 15 illustrates the three-wire handshake communication mode, which is used in peripherals such as a mouse, etc. In the three-wire handshake communication mode, signal lines TH, TR are set for data output (for transmission of signals from I/O interface 26 to a peripheral). Signal lines TL, R, L, D and U are set for data input (for transmission of signals from a peripheral to I/O Interface). When subCPU 2 has started access to a peripheral, signal lines TH, TR and TL are all "1". SubCPU 2 reads data on 4 bits indicative of the former half of data for calculation of peripheral ID-1 from signal lines R, L, D and U. SubCPU 2 outputs "0" as a peripheral select signal to signal line TH and reads data on 4 bits indicative of the latter half of the data for calculation of peripheral ID-1.

Thereafter, when subCPU 2 inverts the signal level on signal line TR to "0", 4-bit data on peripheral ID-2 (ID0–ID3) is output from the peripheral to signal lines R, L, D and U. At this time, the peripheral inverts signal line TL to "0" to inform subCPU 2 that data output to signal lines R, L, D and U has been fixed. After subCPU 2 has confirmed the inversion of signal line TL, it reads data on peripheral ID-2 output to signal lines R, L, D and U. In addition, when subCPU 2 inverts signal line TR to "1", the peripheral outputs data size signals (DSIZE0–DSIZE3) expressing the respective total byte counts of the peripheral data to signal lines R, L, D and U. Confirming the inversion of signal line to "1", subCPU 2 reads the data size signal output onto signal lines R, L, D and U. Thereafter, subCPU 2 sequentially inverts the voltage level on signal line TR so that the peripheral outputs peripheral data (DATA). The peripheral ID-2, data size signal, and peripheral data are delivered through the output register to main-CPU 1b.

The next output peripheral data (R=0, L=0, D=0 and U=0) is connection confirming data. By confirming this data, subCPU 2 is capable of determining whether the peripheral port has been connected correctly. If some plug terminals of the peripheral are pulled away from the socket connector of the data processing apparatus, any one of the pulled-up signal lines R, L, D and U would be "1" and the values of the connection confirming data are not R=0, L=0, D=0 and U=0. Thus, by referring to the connection confirming data, subCPU 2 is capable of determining that the peripheral has been pulled away during the communication to thereby prevent beforehand wrong peripheral data from being fed back to main-CPU 1b.

When the peripheral 2b uses the three-wire handshake communication mode, its plug connector 2ap has a pin configuration of nine pins each electrically independent to each other as shown in FIG. 13A.

FIG. 16 illustrates the clocked parallel communication mode. Setting of the respective signal lines for inputting/outputting purposes in this communication mode is similar to that in the three-wire handshake communication mode except that in the peripherals using the former communication mode, both signal lines TR and TL in the plug connector 2ap are short-circuited, as shown in FIG. 13B, so that the signal output to signal line TR is input unchanged to signal line TL. When subCPU 2 has started access to a peripheral, signal lines TH, TR and TL are all at "1". At this time, subCPU 2 reads 4 bits indicative of the former half of data for calculation of peripheral ID-1 from signal lines R, L, D and U. SubCPU 2 then outputs "0" as a peripheral select signal onto signal line TH and reads 4-bit indicative of the latter half of the data for calculation of peripheral ID-1. SubCPU 2 can select the clocked communication mode on the basis of the calculated peripheral ID-1.

When subCPU 2 outputs "0" onto signal line TR, 4-bit size peripheral ID-2 data is output from the peripheral onto signal lines R, L, D and U. When subCPU 2 then outputs "1" onto signal line TR, 4-bit data-size data is output. Thereafter, subCPU 2 sequentially inverts signal line TR to output peripheral data.

Peripherals ID-1, ID-2, data size, peripheral data and connection confirming data are similar to those in the three-wire handshake parallel communication mode.

FIG. 17 illustrates the clocked serial communication mode, in which signal lines TH, TR are set for data output while signal line U is set for data input. When subCPU 2 starts access to a peripheral, signal lines TH and TR are at "1" while signal line TL is at "0". SubCPU 2 reads 4 bits indicative of the former half of data for calculation of peripheral ID-1 from signal lines R, L, D and U. SubCPU 2 outputs "0" as a peripheral select signal to signal line TH and reads 4 bits indicative of the latter half of the data for calculation of peripheral ID-1. The clocked serial communication mode is determined on the basis of peripheral ID-1 calculated on the basis of those data.

When subCPU 2 accesses a peripheral, subCPU 2 first outputs "0" as a peripheral select signal onto signal line TH. When subCPU 2 outputs a clock signal onto signal line TR, the peripheral outputs data for each bit onto signal line U. As shown in FIG. 17, data such as peripheral ID-2, data-size data, and peripheral data is output in units of one bit. SubCPU 2 reads data output onto signal line U when a clock output onto signal line TR rises. Peripheral-side plug connector terminals in the clocked serial communication mode are shown in FIG. 13C. In the plug connectors 2ap, signal line D is connected to power supply Vcc while signal lines TL, R and L are connected to GND. Thus, when communication is made in accordance with the clocked serial communication mode, and signal lines TL, R and L become "1", subCPU 2 determines that no peripheral has been connected to peripheral port 27.

(Operation)

Subsequently, the operation of the video game system of this embodiment will be described next.

(1) The outline of processing performed in a subCPU control mode:

The processing performed in the subCPU control mode will be outlined below. The subCPU control mode implies an operational state in which subCPU 2 performs collection of peripheral data, etc., in accordance with commands from main CPU 1b, as described above. The processing in the subCPU control mode will be described with reference to a sequence chart of FIG. 18.

<Setting Data Register Group>

First, main CPU 1b executes a CD-ROM set in CD-ROM drive 5a or a program in a ROM cassette inserted into cartridge connection 1e. When main CPU 1b determines that processing is possible in the control mode by subCPU 2, main CPU 1b watches the state of subCPU 2. When switching means 40 is not on the side of subCPU 2, main CPU 1b writes predetermined data into the data register group (FIG. 7) to set the input/output direction of peripheral port 27 (T1).

Setting of the data register group is performed in accordance with a flow chart of FIG. 19. Main CPU 1b outputs predetermined data onto address bus 101 and control bus 102 to select data direction register (DDR) 356 through decoder 251. Main CPU 1b then outputs, for example, "00H" to data bus 103 and sets it in DDR 356 (Step S501). Main CPU 1b outputs predetermined data onto address bus 101 and control bus 102 to select I/O selection register 353 through decoder 251. Main CPU 1b then outputs "0" to data bus 263 and sets "0" in I/O selection register (IOSEL) 353 (step S502). By such operation, the mode is shifted to a subCPU control mode.

I/O selection register 353 in subCPU 2 is set such that subCPU 2 side is selected normally in a state where the power supply for the system is on. Thus, in this case, the switching means 40 has been set so as to be connected to subCPU 2, so that no switching command is output from main CPU 1b.

Since in the subCPU control mode the output terminal of I/O selection register (IOSEL) 353 outputs "0", buffers 361, 363 are opened and buffers 362, 364 are turned on. Thus, the I/O interface 26 right of access has belonged to CPU core 20.

FIG. 9 illustrates that when I/O selection register 358 has been set at "0", right of access to I/O interface 26 has shifted to CPU core 20. In this case, FIG. 9 illustrates that the direction of I/O interface 26 is set for data input irrespective of the value of data direction register 356 and that the states of the buffers, etc., have been determined by subCPU 2, irrespective of the value of port data register 355. FIG. 9 also displays that subCPU 2 is capable of reading peripheral data through port data register 357 when the input state of I/O interface 26 is in any one of upper row states of FIG. 9.

CPU core 20 sets "1" in data direction register 359 as requested to give required data through port data register 358 to a peripheral and collects data through port data register 360 from a peripheral. As just described above, when a peripheral has been connected to CPU core 20, the peripheral is of a low speed type and data is collected at relatively low speed. Thus, for example, a control PAD is used as the peripheral.

That a peripheral is at high speed implies that since CPU core 20 collects data on the peripheral synchronously with a vertical sync signal from monitor 3d, CPU core 20 is required to collect more than a predetermined amount of data at the timing of collecting the data while that a peripheral is at low speed implies that CPU core 20 is required to collect less than the predetermined amount of data at that timing.

CPU core 20 collects data on the peripheral synchronously with a vertical sync signal and feeds the collected data at that timing through the output register to main CPU 1b. Thus, since main CPU 1b is not required to perform the process for the peripheral, the load on main CPU 1b is reduced, so that main CPU 1b can concentrate on image processing and perform the operation of the game system at higher speed.

<Setting of an Input Register>

After data register group 35 has been set, main CPU 1b determines whether the status flag (SF) (FIG. 5) has been reset (whether subCPU 2 can receive commands). If the status flag has been set (subCPU 2 is under execution of a command), main CPU 1d waits until the status flag is reset. When main CPU 1b determines that the status flag has been reset, main CPU 1b sets the status flag, and writes a command parameter into an input resister (IREG) (FIG. 5)(T2). The content set by the command parameter is, for example, optimization of peripheral data collection timing to be described later should be performed or data on the status of subCPU 2 should be returned.

<Issue of an Interrupt Back Command>

In addition, main CPU 1b writes data "10h" representing an interrupt back command (INTBACK) into a command register (COMREG)(FIG. 5)(T3). The interrupt back command is used to cause subCPU 2 to acquire peripheral data. The time when the interrupt back command is issued is shown in FIG. 20. As shown in FIG. 20, the interrupt back command is generally issued during the vertical blanking period (from V-BLANK-IN to V-BLANK-OUT) of a video signal.

<Collection of Peripheral Data>

SubCPU 2 starts collection of peripheral data a predetermined time after subCPU 2 received an interrupt back command through the command register (T4). Generally, main CPU 1b has read peripheral data during V-BLANK where no image is displayed. Thus, as shown in FIGS. 20 and 21, subCPU 2 collects peripheral data at a time (T4–T5) preferably close to V-BLANK-IN (T6) after subCPU 2 received the interrupt back command. As just described above, by reducing the time difference between the timing of starting image control (V-BLANK-IN) and the timing of collecting the peripheral data, main CPU 1b is capable of using the newest content of the momentarily changing peripheral data. Thus, the reaction of the game to the operation of the peripheral is speeded up. For example, even when the content of the peripheral data changes in one field, main CPU 1b is able to acquire the newest peripheral data to thereby provide image control faithful to the operation of the peripheral. This processing is referred to as optimization of peripheral data collection timing.

At a time T4, first, CPU core 20 of subCPU 2 reads signal levels of signal lines R, L, D and U of peripheral port 27 through I/O interface 26. When no peripheral is connected to peripheral port 27, signal lines R, L, D and U pulled up to power supply Vcc become all "1". In this case, peripheral ID-1 becomes an unrecorded value (in FIG. 10, peripheral ID-1 which is not allocated a peripheral, that is, "Fh"), so that subCPU 2 determines that no peripheral is connected.

When the value of peripheral ID-1 read by subCPU 2 is a recorded one, subCPU 2 automatically determines that a peripheral corresponding to the value of peripheral ID-1 has been connected. At this time, subCPU 2 automatically selects an appropriate one of the TH/TR selection communication mode, three-wire handshake communication mode, clocked serial and parallel communication modes, etc., on the basis of the values of signal lines R, L, D and U (FIG. 12).

For example, when TH=1, TR=1, R=0, L=0, D=0, U=1, and TH=0, TR=1, R=0, L=0, D=0 and U=1, subCPU 2 selects the three-wire handshake communication mode shown in FIG. 15. SubCPU 2 sequentially reads peripheral ID-2, data-size data and peripheral data from the peripheral in accordance with the three-wire handshake communication mode. The period for which the peripheral data was read is indicated by FIG. 21B. The read data is stored in the output register (OREG) of sub-CPU 2.

<Creation of an Output Register>

FIG. 22 shows the content of the output register after the Interrupt back command was executed. Data on the respective 2-channel peripheral ports 27 are stored in the same form in the output register. Data 401 on peripheral port 1 includes port 1 status, peripheral 1 data, peripheral 2 data, . . . , peripheral m data, shown by reference numeral 402. The peripheral 1 data, peripheral 2 data, express a plurality of peripheral data connected to the peripheral port through a multitap (connector). Data on the ID of the multitap connected to the peripheral port and data on the number of peripherals connected to the peripheral port are written into the port 1 status, as shown by reference numeral 403. When no peripheral has been connected to the peripheral port or an unrecorded peripheral has been connected to the peripheral port, data on the number of connectors is "0h".

In addition, peripheral information, modified data-size data, and peripheral data (first-nth) are written into a piece of peripheral 1 data, as shown by reference numeral 404. The modified data size is attached when a peripheral having a data size of more than 16 bytes is connected. The peripheral information is composed of data on peripheral ID-2 and data size, as shown by reference numeral 405. NPE bits in the status register SR express the presence/absence of peripheral data which has not been transferred to main CPU 1b. When there is untransferred peripheral data, "1" is written into NPE while when all the peripheral data has been transferred, "0" is written into the NPE. In this way, writing data into the output register is completed (FIG. 11 and T5 in FIG. 18).

<Acquisition of an Output Register, etc.>

In FIG. 18, after writing the peripheral data, etc., into the output register has been completed, subCPU 2 interrupts main CPU 1b at a time T6 (T7). In response to this interrupt, main CPU 1b acquires peripheral data written into the output register. When main CPU 1b refers to the NPE (indicating the presence/absence of the remaining data) in the status register and determines that there is some remaining peripheral data, main CPU 1b requests subCPU 2 to transfer the remaining data to the main CPU (CONTINUE request). SubCPU 2 writes the remaining peripheral data into the output register (T7–T8) and interrupts main CPU 1b. It is to be noted that main CPU 1b makes a CONTINUE request when the peripheral data can not be accommodated in the output register because its size is too large or because a peripheral having a multitap to which a plurality of peripherals has been connected has been used, etc.

Similarly, main CPU 1b acquires the remaining peripheral data from the output register. In this way, in the period of from V-BLANK-OUT to V-BLANK-IN, the peripheral data is divided into data items which are then transferred sequentially to main CPU 1b. When the size of the peripheral data is small, all the peripheral data is transferred one at a time to main CPU 1b during the vertical scanning period. In this way, by transferring all the peripheral data to main CPU 1b, the execution of the interrupt back command is completed (T9). Thereafter, main CPU 1b provides image control such as three-dimensional calculation in a field period after the V-BLANK-IN on the basis of the peripheral data transferred from the peripheral and writes image data obtained by the image control into one of the two frame buffers (for example, on a frame A), as shown in FIG. 23. In the next field, the image data written into the frame buffer on the frame A is displayed, during which period subCPU 2 collects new peripheral data from the peripheral. The displayed picture is switched in units of a plurality of fields in dependence on application software used (FIG. 24).

As described above, by causing subCPU 2 to collect peripheral data, main CPU 1b is not required to access a peripheral which has a low data transfer rate of from several μsec to hundreds of μsec. Thus, image processing is executed at high speed.

(2) Outline of Processing in a Main CPU Direct Mode:

FIG. 19 is a flow chart indicative of the operation of main CPU 1b in a direct mode.

In this flowchart, main CPU 1b executes programs in a CD-ROM set in the CD-ROM drive 5a or in a FIOM cassette inserted into a cartridge connection 1e. When main CPU 1b determines that no peripheral control process can be executed except in a direct mode by main CPU 1b, it outputs predetermined data onto address bus 261 and control bus 262 to thereby select port data register (PDR) 355 through decoder 251.

Then, main CPU 1b outputs a predetermined value onto data bus 263 and sets it in port data register (PDR) 355 (S401 of FIG. 19). Main CPU 21 then outputs predetermined data to address bus 101 and control bus 102 to select data direction register (DDR) 356 through decoder 251.

Then, main CPU 1b outputs a predetermined value onto data bus 103 and sets it in data direction register 356 (S402 of FIG. 19).

In addition, main CPU 1b outputs predetermined data onto address bus 101 and control bus 102 to select I/O selection register 353 through decoder 251. Then, main CPU 1b outputs, for example, "1" onto data bus 103 and sets it in I/O selection register 353 (S403 of FIG. 19).

Since the outputs terminal of I/O selection register 353 outputs "1", buffers 361 and 363 are turned on to open buffers 362 and 364. Thus, the I/O right of access to I/O is transferred to main CPU 1b.

Here, the 8 lower row states of FIG. 9 express ones in which I/O selection register 353 has been set at "1" and the I/O interface 26 right of access has been transferred to main CPU 1b.

In this case, when the value of data direction register 356 is "0", this value is fed through buffer 363 to the control input terminal of buffer 365. Thus, buffer 365 is placed in an open state and the direction of I/O interface 26 is set for data input. The state of CMOS transistors of multiplexer 36, etc., changes as shown in FIG. 9 in dependence on the value of port data register 359; that is, when the value of port data register 359 is "0", the impedance of the CMOS transistors is high while when the value of the register 359 is "1", pull-up MOS transistors are turned on. Main CPU 1b then reads a logic value depending on the input state of I/O interface 26 through port data register 351.

When the value of data direction register 356 is "1", this value is delivered through buffer 363 to the control input terminal of buffer 365. Thus, buffer 365 is turned on and hence the direction of I/O 26 is set for data output. The state of the CMOS transistors of multiplexer 36, etc., changes as shown in FIG. 9 in dependence on the value of port data register 355; that is, when the value of the register 355 is "0", the NMOS transistors are turned on while when the value of the port data register 355 is "1", the pull-up MOS and PMOS transistors are turned on, and the value written from main CPU 1b to port data register 355 is fed through I/O interface 26 to the peripheral. At this time, a logical value depending on the value set in port data register 355 is read through port data register 357 by main CPU 1b. When the mode is shifted from the main CPU direct mode to the subCPU control mode, the flow chart of FIG. 25 is required to be executed again.

As described above, in the present embodiment, subCPU 2 is capable of controlling the peripherals and collecting data from the peripherals as requested. In greater detail, main CPU 1b is capable of directly controlling the peripherals and directly collecting data from the peripherals as requested. Main CPU 1b is also capable of writing data directly into the peripherals. Possible peripherals in this case are the ones which require high speed data communication. Thus, the appropriate high speed peripherals are storages such as external memories, floppy disks and hard disks, and printers.

Thus, according to this direct control mode, the following advantages are obtained.

(a) Even when peripherals which subCPU 2 can not manage and control are connected to socket connectors 2as, main CPU 1b can manage and control them. Since the connection switching means is capable of connecting the peripherals to the main CPU when a large amount of data is output from a peripheral, even a peripheral which outputs a large amount of data can be controlled;

(b) Data is deliverable to peripherals such as storage devices which include a printer, external memory, floppy disk, and hard disk;

(c) Peripherals (for example, an external memory, floppy disk, hard disk, etc.) which requires access at higher speed than the maximum possible processing speed of subCPU 2 are controllable; and (d) Even when there are insufficient points in subCPU 2, main CPU 1b is capable of directly controlling the peripherals, so that such problems are conquered.

(3) Details of Optimization of Peripheral Data Collection Timing:

As described above, in the video game system of this embodiment, optimization of peripheral data collection timing is performable.

This optimization is mainly classified into three processes. A first process is initialization shown in the flow chart of FIG. 26. This process involves initialization of flags performed at the timing of FIG. 27 (for example, at the time of turning on the power supply). A second process is an V-BLANK-IN interrupt process shown in the flow chart of FIG. 28. This process involves calculation of the peripheral data collection timing at a time V-BLANK-IN, as shown in FIG. 27. A third process involves a peripheral process shown in the flow chart of FIG. 29. This process involves causing a timer to count until the peripheral data collection timing calculated in the second process and collecting the peripheral data at that time. The third process starts directly after the second process has ended. In many cases, collection of the peripheral data is at a time (near V-BLANK-IN) in the latter half of the third process.

The first-third processes will be described next with reference to flow charts of FIGS. 26, 28 and 29 and a timing chart of FIG. 30.

First, when the power supply for the video game system is turned on, the first process (initialization) is performed (T101 of FIG. 30). The content of the first process is shown by the flow chart of FIG. 26. First, subCPU 2 substitutes "0" into flag 1 to initialize same (S101). Flag 1 indicates whether the peripheral data collection timing should be optimized when the next peripheral process is performed. At its initialization, flag 1 is "0" (unoptimized). SubCPU 2 substitutes "1" into flag 2 to initialize same (S102). Flag 2 indicates whether a time-out (V-BLANK-IN) has occurred during collection of peripheral data. If so, "0" is written into flag 2. Subsequently, subCPU 2 substitutes "0" into a variable A to initialize variable A (S103). Variable A-indicates the peripheral data collection timing calculated by subCPU 2 and the time of from V-BLANK-IN to the peripheral data collection timing.

When a V-BLANK-IN interrupt occurs after the first process (T102), a second process (V-BLANK-IN interrupt process) is performed. The content of this second process is shown by the flow chart of FIG. 28. First, subCPU 2 determines the content of flag 1 (S201). At this time, since the content of flag 1 is set at "0" by the initialization, subCPU 2 performs a process at S205. That is, subCPU 2 changes the content of counter X to "0" (T102). Counter X is incremented by an internal counter 24 (FIG. 2) of subCPU 2.

After the second process has ended, the third process (peripheral process) is performed (T103). The content of the third process is shown in the flow chart of FIG. 29. First, subCPU 2 substitutes "0" into flag 2 (S301) and determines the content of flag 1 which expresses whether optimization should be performed (S302). At this time, since flag 1 remains "0" ("0" at S302), subCPU 2 performs processes at S305 and subsequent steps.

At S305, subCPU 2 substitutes the value of counter X into valuable A. That is, a value indicative of the time Y0 of from the time T102 to the time T103 in FIG. 30 is substituted into variable A. Thereafter, subCPU 2 starts collection of peripheral data (S306, T103). Then, subCPU 2 determines whether the current time has reached V-BLANK-IN (S307) while continuing to collect the peripheral data (S306–S309). When collection of all the peripheral data has ended (YES at S309, T104), subCPU 2 writes the collected peripheral data into the output register (S310). Simultaneously, subCPU 2 substitutes "0" into counter X(S311). That is, at time T104, the content of counter X is reset and the counting operation of counter X starts again.

When a V-BLANK-IN interruption occurs (T105), the second process is performed. At this time, since the content of flag 1 is "0" and the content of flag 2 indicative of the occurrence of a time-out is also "0", subCPU 2 performs a process at S203, in which subCPU 2 adds the count in counter X to variable A and substitutes the difference between the sum of the count of counter X and variable A and margin α into variable A (S203). At this time, the value of variable A indicates time Y0 and the count of counter X indicates time Z0 (FIG. 30). Thus, variable A=Y0+Z0−α= Y1, which indicates the time of from the current time T105 to the next peripheral data collection timing (T106). Thus, if peripheral data is collected a time Y1 after the current time (T105), the peripheral data collection timing can be caused to approach V-BLANK-IN without the occurrence of any time-out. If the next peripheral collection time (T106–T107) exceeds the last peripheral data collection time (T103–T104) by more than a margin a, a time-out will occur. Margin α is a leeway time (of approximately 1 msec) which reduces the possibility of occurrence of the time-out. Expression "1FM= Y0+Z0+peripheral data collection time" holds where 1 FM is afield time (of approximately 16.6 msec in the case of NTSC).

Subsequently, subCPU 2 substitutes "1" into flag 1 to optimize the peripheral data collection timing in the next peripheral process (S204), and resets counter X(S205). Thereafter, the third process is performed. SubCPU 2 substitutes "0" into flag 2 (S301) and determines the content of flag 1 (S302). At this time, since flag 1 is at "1", subCPU 2 performs processing at S303 and S304. In the processing at S304, subCPU 2 determines whether the count of counter X has reached the value of variable A (=Y1) (step S304). When the current time has not reached the peripheral data collection timing (YES at S304), subCPU 2 continues to perform the processing at S304. In this way, when the current time reaches the peripheral data collection timing (NO at S304, T106), after setting the count of counter X into the value of variable A (S305), subCPU 2 starts to collect the peripheral data (S306). When collection of the peripheral data has ended (YES at S309, T106.) before the time has reached V-BLANK-IN during collection of the peripheral data (NO at S307), subCPU 2 writes the peripheral data into the output register (S310) and resets counter X to terminate the second process.

Thereafter, similarly, subCPU 2 repeats the second and third processes. That is, in the second process (T108), subCPU 2 calculates the time Y2 (=Y1+Z1–α) of from time T108 to the next peripheral data collection timing (T109) on the basis of the values of the last Y1, Z1 and margin α. In the third process, subCPU 2 starts to collect the peripheral data after a lapse of time Y2 (T109–T110).

In the second process (T111), subCPU 2 calculates the time Y3 (=Y2+Z2–α) of from time T111 to the next peripheral data collection timing T112 on the basis of the values of the last Y2, Z2 and margin α. When the last peripheral data collection time (T109–T110) is short, time Y3 increases. Assume now that the next peripheral data collection timing T112 is delayed and a time-out has occurred (T113). In this case, in the third process, subCPU 2 determines that a V-BLANK-IN interruption has occurred during collection of the peripheral data (YES at S307). SubCPU 2 then substitutes "1" into flag 2 indicative of the occurrence of a time-out (S308).

Since flag 2 is at "1" in the second process, processes at S203 and S204 are not performed, so that flag 1 continues to maintain the state of "0". In the next third process, flag 1 is at "0" (S302), so that subCPU 2 immediately starts to collect peripheral data (S306-). As just described above, when a time-out occurs during collection of the last peripheral data, subCPU 2 performs a process which renders earlier the peripheral data collection timing at the next time to thereby prevent continuous occurrence of the time-out beforehand.

As described above, by optimization of the peripheral data collection timing, this timing is caused to approach the timing of acquisition of peripheral data by main CPU 1 (FIG. 21). By causing the peripheral data collection timing to approach the image control starting time (V-BLANKIN), the reaction of the game to the operation of the peripheral is speeded up. For example, even when the content of the peripheral data changes, for example, in one field, main CPU 1b can acquire the newest peripheral data to thereby achieve image control faithful to the operation of the peripheral.

Calculation of the peripheral data collection timing (S203 of the second process) has been performed without referring to one field time. Thus, the optimization of the peripheral data collection timing can be performed without relying on the standards of video signals such as NTSC, and PAL.

While in the present embodiment the optimization is performed by using V-BLANK-IN (vertical blanking signal), a similar effect is achieved by using a signal such as V-BLANK-OUT. A process is performable in which no optimization is performed in accordance with a command (to set a command parameter when an interrupt back command is issued) from main CPU 1b. In addition, it may be set whether peripheral data for each of the two-channel peripheral ports 27 should be acquired. Alternatively, optimization may be performed every several fields, for example, every frame (=every two fields) (the lowest portion of FIG. 27).

By changing the clock frequency, etc., the time (transfer speed) required for reading the peripheral data may be controlled, which can end (or optimize) collection of the peripheral data directly before the image control starts.

The optimization performed in this embodiment may be applicable not only to image processing, but also to voice processing and other data processing to thereby achieve an acoustic process, for example, in a video game system rapidly in response to the operation of the peripherals.

(4) Determination of a Peripheral Connection State:

In a state where the power supply for the video game system has been on, the user can plug the peripheral plug connector into the data processing apparatus socket connector (hot plug-in) or otherwise pull out the peripheral plug connector from the data processing apparatus socket connector (hot plug-out). When the hot plug-in or hot plug-out is performed during the time when the data processing apparatus is reading identification data from the peripheral, subCPU 2 can read wrong peripheral ID-1. In this case, since subCPU 2 can not correctly determine whether the peripheral has been connected to the game system, a serious problem occurs that subCPU 2 would wrongly recognize the peripheral on the basis of wrong peripheral ID-1.

The present embodiment solves these problems to the best of the ability thereof by automatically determining the peripheral connection state in the following process.

<Determination of Peripheral Connection State Using Peripheral ID-1>

When a peripheral is accessed, subCPU 2 first obtains peripheral ID-1 in dependence on the states of signal lines TH, TR, R, L, D and U. The method of determining peripheral ID-1 is the same in the THITR selection communication mode (FIG. 14), three-wire handshake communication mode (FIG. 15), and clocked parallel and series communication modes (FIGS. 16 and 17, respectively). That is, the connection state of peripherals is determined in the same method for all the peripherals.

FIG. 31 outlines a process for determining a peripheral connection state, using peripheral ID-1. SubCPU 2.which has received an interrupt back command accesses a peripheral in units of one field (16.6 msec in the case of NTSC). Alternatively, the subCPU may access the peripheral in units of more than one field.

When no peripheral has been connected to peripheral port 27 (T200–T201), all signal lines R, L, Dand U pulled up to power supply Vcc are "1". SubCPU 2 reads 4 bits indicative of the former half of peripheral ID-1 from the states of signal lines R, L, D and U (first), and then 4 bits indicative of the latter half of the peripheral ID-1 (second) (T201). SubCPU 2 calculates peripheral ID-1 on the basis of those read bits. At this time, since no peripheral has not been connected to the peripheral port, subCPU 2 determines that peripheral ID-1 has been "unconnected". Thus, peripheral ID-1 indicative of "being unconnected" is transferred to main CPU 1b.

Thereafter, the user starts to plug a peripheral such as control PAD into the data processing apparatus socket connector (T202). As the peripheral is inserted deeper into the socket connector, the number of signal lines connected increases gradually. At a time T203 which is 16.6 msec after the last access time T201, subCPU 2 reads peripheral ID-1, at which time, since the connection state of the signal lines is very unstable, only some of the signal lines have been connected. Thus, the value of peripheral ID-1 at this time is different from that at the last time (T201). Thus, subCPU 2 determines that the connection state is unstable and transfers data indicative of "being unconnected" back to main CPU 1b. In a state where only some of the signal lines have been connected, the value of the peripheral ID-1 expresses awrong peripheral ID-1.

After all the signal lines have been connected (T204-), the state of the signal lines is stabilized, so that peripheral ID-1 at time T205 has a correct value. It is to be noted that the value of peripheral ID-1 at this time is different from that at the last time (T203). Thus, subCPU 2 determines that the connection state of the signal lines is still unstable and transfers data indicative of "being unconnected" back to main CPU 1b.

At time T206 after a lapse of 16.6 msec, peripheral ID-1 takes a value similar to that at the last time (T205). Thus, subCPU 2 determines that all the signal lines have been connected and transfers peripheral data, etc., back to main CPU 1b.

While in the above the process performed in the hot plug-in has been described, a similar process is performed also in the hot plug-out. More specifically, when the user starts to pull out a peripheral from the connector, peripheral ID-1 at time T207 is different from that at time T209. Thus, subCPU 2 determines that the connection state is unstable. Since some of the signal lines have been still connected at time T209, the value of peripheral ID-1 is likely to be wrong. When all the signal lines are unconnected (T210), all the pulled-up signal lines are "1". Thus, in this case, subCPU 2 determines that the signal lines are unconnected (T211).

FIG. 32 shows time periods when the connection states in the hot plug-in and -out, respectively, are stable. In the graph of FIG. 32, the horizontal axis indicates time periods taken from the occurrence of hot plug-in and -out, respectively, to the stabilization of the connection state of the signal lines (where all the signal lines have been connected or otherwise unconnected). The vertical axis expresses the count of observed unstable connection states (where some of the signal lines are unconnected). It will be confirmed from the graphs that after the occurrence of hot plug-in and -out, the connection state is stabilized with time. Especially, after a lapse of one field time, the count of observed unstable connection states decreases greatly. For example, in the hot plug-in, the connection state is stabilized with a probability of approximately 85% while in the hot plug-out the connection state is stabilized with a probability of approximately 100%. Thus, in the above process, when peripheral ID-1 read at an interval of 16.6 msec takes the same value twice successively, the connection state can be regarded as stabilized. According to the above determination process, wrong recognition of peripheral ID-1, etc., in the hot plug-in and -out is prevented with a probability of more than 85%.

<Determination of a Connection State, Using a Pulled-Up Signal Lines>.

All the signal lines TH, TR, TL, R, L, D and U have been pulled up by corresponding resisters to power supply Vcc. Thus, when a signal line which should originally output "0" outputs "1", it may be determined that no peripheral has been connected to this signal line. For-example, in the three-wire handshake communication mode (FIG. 15) and clocked parallel communication mode (FIG. 16), R=0, L=0, D=0 and U=0 are output from the peripheral as connection confirming data after the peripheral data. Thus, when any one of these signal lines is "1", subCPU 2 determines that some of the signal lines are unconnected. In the clocked serial communication system, signal lines TL, R and L have been connected to GND on the peripheral side. Thus, when signal lines TL, R and L are "1", it can be determined that the signal lines are unconnected. Signal lines R, L, D and U may be pulled down to GND. In this case, R=1, L=1, D=1 and U=1 are required to be output as connection confirming data.

<Determination by Control Signal Lines TR, TL>

When subCPU 2 requests a peripheral to output data (when signal line TR is inverted) in the three-wire handshake communication mode (FIG. 15), the peripheral sends a signal indicative of data output (response signal) back to signal line TL (signal line TL is inverted). If at least one of signal lines TR, TL is unconnected, no signal is output from the peripheral to signal line TL. When signal line TL is not inverted by the peripheral a predetermined time after subCPU 2 output a signal to signal line TR, subCPU 2 can determine that any one of signal lines TR, TL is unconnected. Thus, subCPU 2 can determine that no peripherals have been connected in a stabilized manner to the socket connector to thereby avoid the problem of wrong recognition of the peripherals.

By combining the above-mentioned determination of peripheral connection state, using peripheral ID-1, determination of connection state by a pulled-up signal line, and determination by control signal lines TR, TL, the connection states are determined more accurately.

The present invention is not limited to the above embodiment and can be carried out without departing from the spirit and scopes of the present invention.

As described above, according to the present embodiment, the following advantages are produced:

First, data processing including image control is performed at high speed. By causing the suboperation means to perform the collection of peripheral data, the main operation is not required to access a peripheral which has a low data transfer speed. That is, since the connection switching means connects a peripheral to the main operation means or the suboperation means in accordance with a switching signal from the main operation means, the data processing apparatus is capable of maintaining optimal the compatibility between the image processing characteristic and the data input/output characteristic for a peripheral in accordance with the characteristics and content of the image processing environment including the content of the kind of-the peripheral, the content of a program of the main operation means, etc. When the switching means is switched in accordance with the operational speed characteristic of a peripheral, the connection switching means connects a peripheral which has a low operational speed characteristic to the suboperatlon means to thereby reduce the load on the main operation means. When a peripheral has a high operational speed characteristic, the main operation means which usually has a high processing ability is caused to be in charge of inputting/outputting data to/from the peripheral to thereby ensure to achieve its purpose. Thus, the main operation means is capable of executing a larger amount of work and providing image processing at increased speed. Especially, in a video game which requires to control an image on a real time basis, characters, etc., are moved at high speed.

In the data processing apparatus, the connection switching means is arranged to be controlled in accordance with a program executed by the main operation means. For example, if a high speed peripheral is required when the main operation means executes an image processing program, the connection switching means is controlled so as to connect the main operation means to a peripheral while if otherwise, the connection switching means connects a peripheral to the suboperaiton means. Thus, selection of an appropriate peripheral suitable for the content, kind, etc., of the image processing is ensured.

Second, the content of operation of a peripheral is directly reflected in the data processing which includes image control. The timing of collecting peripheral data is caused to approach the timing of starting image control as much as possible. Thus, for example, in a video game including an attack by an airplane, the time of from the user's operation of a peripheral to launching a missile is minimized, so that the user can enjoy a video game with a natural sense.

Third, it can be determined whether a peripheral is connected to the data processing apparatus in a stabilized manner to thereby avoid a problem such as wrong recognition of the peripheral. For example, when successively read peripheral data is different from each other, it can be determined that the connection state of the peripheral is unstable. In addition, the connection state of a peripheral can be determined in dependence on whether the data received by the data processing apparatus coincides with proper data to be output from the peripheral. For example, when it is determined that a signal line has not been connected to the connector terminal of data processing apparatus due to hot plug-in, etc., there is a strong probability that the data (identification data on the kind of a peripheral, peripheral data on the state of a peripheral, etc.) received by the image control means is wrong. Thus, the image control means recognizes that the received data is wrong to thereby avoid possible wrong recognition and operation of the peripheral due to the use of the wrong data.

Thus, an optimal game environment is provided in a video game system, etc.

We claim:

1. A data processing apparatus comprising:
    a main data processor;
    a peripheral port to which a peripheral device is detachably connectable;
    I/O interface means connected to the peripheral port;
    bus means connected to said main data processor;
    a sub-data processor functionally connected with the main data processor via the bus means, wherein the sub-data processor identifies the kind of the peripheral device based on the identification data supplied from the peripheral device and supplies data indicative of the identified kind of the peripheral device to the main data processor; and
    switching means functionally connected with said I/O interface means, said bus means and said sub-data processor so as to switch over access to the peripheral device via the I/O interface means by the main data processor and by the sub-data processor.

2. The data processing apparatus of claim 1, wherein the switching means switches over access in accordance with a control signal from the main data processor.

3. The data processing apparatus of claim 2, wherein the switching means connects the I/O interface means with the main data processor when the peripheral device is of a kind requiring a high access speed and with the sub-data processor when the peripheral device is of a kind requiring a low access speed.

4. The data processing apparatus of claims 3, wherein the switching means switches over access in accordance with a program executed by the main data processor.

5. The data processing apparatus of claims 2, wherein the switching means switches over access in accordance with a program executed by the main data processor.

6. The data processing apparatus of claim 1, wherein the switching means switches over access in accordance with the kind of the peripheral device.

7. The data processing apparatus of claim 6, wherein the switching means connects the I/O interface means with the main data processor when the peripheral device is of a kind requiring a high access speed and with the sub-data processor when the peripheral device is of a kind requiring a low access speed.

8. The data processing apparatus of claims 7, wherein the switching means switches over access in accordance with a program executed by the main data processor.

9. The data processing apparatus of claims 6, wherein the switching means switches over access in accordance with a program executed by the main data processor.

10. The data processing apparatus of claim 1, wherein the switching means connects the I/O interface means with the main data processor when the peripheral device is of a kind requiring a high access speed and with the sub-data processor when the peripheral device is of a kind requiring a low access speed.

11. The data processing apparatus of claims 10, wherein the switching means switches over access in accordance with a program executed by the main data processor.

12. The data processing apparatus of claims 1, wherein the switching means switches over access in accordance with a program executed by the main data processor.

13. A data processing apparatus comprising:
    a main data processor;
    a peripheral port to which a peripheral device is detachably connectable;
    interface means connected to the peripheral port;
    bus means connected to said main data processor;
    a sub-data processor functionally connected with the main data processor via the bus means; and
    switching means functionally connected with said I/O interface means, said bus means and said sub-data processor so as to switch over access to the peripheral device via the I/O interface means by the main data processor and by the sub-data processor, in accordance with a control signal from the main data processor.

14. The data processing apparatus of claim 13, wherein the switching means connects the I/O interface means with the main data processor when the peripheral device is of a kind requiring a high access speed and with the sub-data data processor when the peripheral device is of a kind requiring a low access speed.

15. The data processing apparatus of claims 14, wherein the switching means switches over access in accordance with a program executed by the main data processor.

16. The data processing apparatus of claims 13, wherein the switching means switches over access in accordance with a program executed by the main data processor.

17. A data processing apparatus comprising:
    a main data processor;
    a peripheral port to which a peripheral device is detachably connectable;
    I/O interface means connected to the peripheral port;
    bus means connected to said main data processor;
    a sub-data processor functionally connected with the main data processor via the bus means; and
    switching means functionally connected with said I/O interface means, said bus means and said sub-data processor so as to switch over access to the peripheral device via the I/O interface means by the main data processor and by the sub-data processor, in accordance with the kind of the peripheral device.

18. The data processing apparatus of claim 17, wherein the switching means connects the I/O interface means with the main data processor when the peripheral device is of a kind requiring a high access speed and with the sub-data processor when the peripheral device is of a kind requiring a low access speed.

19. The data processing apparatus of claims 18, wherein the switching means switches over access in accordance with a program executed by the main data processor.

20. The data processing apparatus of claims 17, wherein the switching means switches over access in accordance with a program executed by the main data processor.

21. A data processing apparatus comprising:
a main data processor
a peripheral port to which a peripheral device is detachably connectable;
I/O interface means connected to the peripheral port;
bus means connected to said main data processor;
a sub-data processor functionally connected with the main data process via the bus means; and
switching means functionally connected with said I/O interface means, said bus means and said sub-data processor so as to switch over access to the peripheral device via the I/O interface means by the main data processor and by the sub-data processor, wherein the switching means connects the I/O means with the main data processor when the peripheral device is of a kind requesting a high speed and with the sub-data processor when the peripheral device is of a kind requiring a low access speed.

22. The data processing apparatus of claims 21, wherein the switching means switches over access in accordance with a program executed by the main data processor.

23. A data processing apparatus comprising:
a main data processor;
a peripheral port to which a peripheral device is detachably connectable;
I/O interface means connected to the peripheral port;
bus means connected to said main data processor;
a sub-data processor functionally connected with the main data processor via the bus means; and
switching means functionally connected with said I/O interface means said bus means and said sub-data processor so as to switch over access to the peripheral device via the I/O interface means by the main data processor and by the sub-data processor, in accordance with a program executed the main data processor.

24. The data processing apparatus of any one of claim 1–8, wherein the suboperation means comprises data collection means for starting at a predetermined time the collection of peripheral data output from the peripheral, data processing means for executing data processing at predetermined intervals of time on the basis of the collected peripheral data, and data collection control means for determining the time of starting the collection of the peripheral data such that the collection of the peripheral data by the data collection means ends directly before the time of starting the data processing.

25. The data processing apparatus of any one of claims 1–8, comprising determination means for determining whether a signal line of the peripheral is connected to a terminal of the data processing apparatus.

26. The data processing apparatus of claim 24, comprising determination means for determining whether a signal line of the peripheral is connected to a terminal of the data processing apparatus.

27. The data processor of claim 1, wherein said register table comprises a command register in which the main CPU writes a command to transmit the command to the CPU core, status register data of which are read out by the main CPU for examining a state of the CPU core after the CPU core executed the command, a status flag indicative of whether or not the CPU core is under execution of the command by setting the status flag before the main CPU writes the command in the command register and resetting the status flag after the CPU core executed the command, an input register in which the main CPU writes a command parameter associated with the command to transmit the command parameter to the CPU core, and an output register in which the CPU core writes data to transmit the data to the main CPU.

28. A data processor comprising:
I/O interface means through which the data processor communicates with a peripheral device which is detachably connectable to a peripheral port of a data processing apparatus wherein the data processor is functionally incorporated;
CPU bus means through which the data processor communicates with a main CPU which is functionally incorporated in the data processing apparatus;
a CPU core functionally connected to the CPU bus means so as execute a command provided from the main CPU;
a ROM storing a program required for processing the command; and
a switching means which functionally connects the I/O interface selectively with one of the CPU bus means and the CPU core in compliance with an access speed required by the peripheral device.

29. A data processor comprising:
I/O interface means through which the data processor communicates with a peripheral device which is detachably connectable to a peripheral port of a data processing, apparatus wherein the data processor is functionally incorporated;
CPU bus means through which the data processor communicates with a main CPU which is functionally incorporated in the data processing apparatus;
a CPU core functionally connected to the CPU bus means so as to execute a command provided from the main CPU;
a ROM storing a program required for processing the command; and
a switching means which functionally connects the I/O interface selectively with one of the CPU bus means and the CPU, wherein said switching means comprises a multiplexer which is connected to the I/O interface means, and register means which functionally connects the multiplexer with the CPU core and with the CPU bus means.

30. The data processor of claim 29, wherein said register means comprises a first register group which functionally connects the multiplexer with the CPU core, a second register group which functionally connects the multiplexer with the CPU bus means, and an I/O selection register which controls the switching function of the multiplexer so as to allow one of the main CPU and the CPU core to access the peripheral device responsively to the data set in the I/O selection register.

31. The data processor of claim 30, wherein each of the first and second register group comprises a data direction register which sets signal line directions of input/output data at the peripheral port and a port data register which stores data at the peripheral port.

32. The data processor of claim 29, wherein said multiplexer comprises a plurality of three-state buffers which perform switching functions responsive to control data set into the I/O selection register.

33. A data processor comprising:
I/O interface means through which the data processor communicates with a peripheral device which is detachably connectable to a peripheral port of a data processing apparatus wherein the data processor is functionally incorporated;

CPU bus means through which the data processor communicates with a main CPU which is functionally incorporated in the data processing apparatus;

a CPU core functionally connected to the CPU bus means so as to execute a command provided from the main CPU;

a ROM storing a program collecting peripheral data from the peripheral device to send the peripheral data to the main CPU when the CPU core receives from the main CPU a command notifying a start of collection of the peripheral data; and a switching means which functionally connects the I/O interface selectively with one of the CPU bus means and the CPU.

34. The data processor of claim 33, further comprising an interface means provided between the CPU core and the CPU bus means and having a register table through which data communication between the main CPU and the CPU core is carried out.

35. A peripheral for supplying peripheral data to a data processing apparatus having a main data processor processing the peripheral data, a sub-data processor functionally connected to the main data processor, a peripheral port to which the peripheral is detachably connectable, an I/O interface means connected to the peripheral port, and switching means for switching over access to the peripheral via the I/O interface means by the main data processor and by the sub-data processor responsively to designation of either one of a first control mode allowing the main data processor to directly gain access to the peripheral through the I/O interface means to collect the peripheral data and a second control mode allowing the sub-data processor to gain access to the peripheral through the I/O interface means to collect the peripheral data and provide the main data processor the collected peripheral data, wherein the peripheral is constructed in a manner that the peripheral supplies the peripheral data to the I/O interface means responsively to the access of either one of the main data processor and the sub-data processor, the peripheral data including data manually-inputted by a user.

36. The peripheral of claim 35, wherein the peripheral data includes an identification data indicative of a kind of the peripheral, thereby the sub-data processor identifies the kind of the peripheral.

37. The peripheral of claim 35, wherein the peripheral data includes data for confirming the peripheral has been connected to the peripheral port of the data processing apparatus.

38. The peripheral of claim 37, wherein the peripheral is detachably connectable with the data processing apparatus in which the switching means connects the I/O interface means with the main data processor when the peripheral device is of a kind requiring a high access speed while with the sub-data processor when the peripheral device is of a kind requiring a low access speed.

* * * * *